US010876525B2

(12) United States Patent
Yanagibayashi

(10) Patent No.: US 10,876,525 B2
(45) Date of Patent: Dec. 29, 2020

(54) LIQUID FEED DEVICE, LIQUID FEED CONTROL METHOD FOR LIQUID FEED DEVICE, AND LIQUID FEED CONTROL PROGRAM FOR LIQUID FEED DEVICE

(71) Applicant: Shimadzu Corporation, Kyoto (JP)

(72) Inventor: Jun Yanagibayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 303 days.

(21) Appl. No.: 15/764,565

(22) PCT Filed: Nov. 26, 2015

(86) PCT No.: PCT/JP2015/083217
§ 371 (c)(1),
(2) Date: Mar. 29, 2018

(87) PCT Pub. No.: WO2017/090148
PCT Pub. Date: Jun. 1, 2017

(65) Prior Publication Data
US 2018/0274531 A1 Sep. 27, 2018

(51) Int. Cl.
*F04B 49/06* (2006.01)
*F04B 23/06* (2006.01)
(Continued)

(52) U.S. Cl.
CPC ............ *F04B 49/065* (2013.01); *F04B 13/00* (2013.01); *F04B 23/06* (2013.01); *F04B 49/20* (2013.01);
(Continued)

(58) Field of Classification Search
CPC ........ F04B 49/065; F04B 13/00; F04B 23/06; F04B 49/20; F04B 2201/0202; F04B 2205/03; G01N 30/32; G01N 2030/326
See application file for complete search history.

(56) References Cited

U.S. PATENT DOCUMENTS

2004/0251203 A1 12/2004 Zelechonok
2006/0219618 A1 10/2006 Witt et al.
(Continued)

FOREIGN PATENT DOCUMENTS

| JP | 2008-507033 A | 3/2008 |
| JP | 2008-215978 A | 9/2008 |
| JP | 2014-2153 A | 1/2014 |

OTHER PUBLICATIONS

International Search Report dated Mar. 1, 2016 of corresponding International application No. PCT/JP2015/083217; 4 pgs.
(Continued)

*Primary Examiner* — Connor J Tremarche
(74) *Attorney, Agent, or Firm* — Maier & Maier, PLLC

(57) ABSTRACT

A liquid feeding apparatus includes: a plurality of plunger pumps fluidly connected in series or in parallel between a suction flow path and a discharge flow path; and a control unit configured to control an operation of the plunger pump. The control unit includes a compensation flow rate calculation unit configured to calculate a positive compensation flow rate which changes with time in synchronization with the period with respect to a set flow rate. The compensation flow rate is a flow rate which compensates for a loss of the flow rate caused by cooling and contraction in a discharge stroke after the fluid in the plunger pump is compressed and heated in a pre-compression stroke. The compensation flow rate calculation unit is configured to calculate the compensation flow rate.

26 Claims, 17 Drawing Sheets

(51) Int. Cl.
    *F04B 49/20*     (2006.01)
    *G01N 30/32*     (2006.01)
    *F04B 13/00*     (2006.01)

(52) U.S. Cl.
    CPC ...... *G01N 30/32* (2013.01); *F04B 2201/0202* (2013.01); *F04B 2205/03* (2013.01); *G01N 2030/326* (2013.01)

(56) References Cited

U.S. PATENT DOCUMENTS

| | | | |
|---|---|---|---|
| 2008/0080981 A1* | 4/2008 | Witt | G01N 30/32 417/32 |
| 2008/0206067 A1 | 8/2008 | De Corral et al. | |
| 2012/0216886 A1* | 8/2012 | Herzog | F04B 11/0058 137/544 |
| 2013/0336803 A1 | 12/2013 | Ruegenberg et al. | |

OTHER PUBLICATIONS

Office Action dated Oct. 9, 2019, in corresponding Chinese Application No. 201580084627.2; 17 pages.

Second Chinese Office Action dated Jun. 2, 2020, in connection with corresponding CN Application No. 201580084627.2 (15 pp., including machine-generated English translation).

* cited by examiner

LIQUID FEED DEVICE, LIQUID FEED CONTROL METHOD FOR LIQUID FEED DEVICE, AND LIQUID FEED CONTROL PROGRAM FOR LIQUID FEED DEVICE

The invention relates to a liquid feeding apparatus, a method for controlling liquid feeding of the liquid feeding apparatus, and a liquid feeding control program of the liquid feeding apparatus.

BACKGROUND

FIG. 15 illustrates a schematic diagram of a liquid chromatograph.

A mobile phase such as water and organic solvent is stored in a mobile phase bottle 101. The mobile phase passes through a flow path pipe 102 and is fed under high pressure to a subsequent stage by a liquid feed pump 103. Samples to be analyzed are introduced and mixed into the mobile phase by a sample injector 104 and conveyed to a column 105. In the column 105, each component substance in the sample is held for a different time depending on the affinity with the column and the mobile phase, and then eluted from a column outlet.

Each component substance sequentially eluted in this way is detected by a detector 106. The mobile phase and each component substance passing through the detector 106 are discharged to a waste bottle 107. The signal obtained by the detector 106 is transferred to a data processing unit 109 by a signal line 108, and qualitative processing and quantitative processing of each component substance are executed.

In FIG. 15, one mobile phase bottle 101 and one liquid feed pump 103 are drawn. This is a so-called isocratic type. In addition to this, there is a method in which a plurality of (usually at most four kinds) mobile phase bottles is provided and the mobile phase bottles are successively sucked to one liquid feed pump via a proportional solenoid valve to achieve a desired mobile phase composition. This is referred to as a low-pressure gradient type.

Also, there is a method in which one liquid feed pump is made to correspond to a plurality of (usually at most two) mobile phase bottles, respectively, and the mobile phases are merged at the outlet (and in front of the sample injector) of each liquid feed pump to achieve the desired phase composition. This is referred to as a high-pressure gradient type.

As can be understood from the principle of the aforementioned liquid chromatograph, controlling the mobile phase to a desired composition is an essential requirement for ensuring the reliability of the analysis result. In particular, in the high-pressure gradient type, the flow rate stability of the liquid feed pump has a direct influence on the reproducibility of the mobile phase composition. Further, in some cases, pulsation of composition and pressure of the mobile phase may be detected as noise, depending on the type of detector.

For these reasons, high liquid flow rate stability (low pulsation performance) has been demanded for the liquid feed pump of the liquid chromatograph. First, a plunger pump type has been generally used to feed a low flow rate (for example, several mL/min or less) used in the liquid chromatograph at a high pressure (for example, several tens of MPa). Furthermore, since the liquid feeding is intermittent in the plunger pump, a double plunger type has been introduced in which two plunger flow paths are connected in series or in parallel to alternately compensate for the intermittent liquid feeding. Recently, in many cases, in order to more precisely drive the plunger, an independent drive type having individual actuators for each plunger has been often adopted.

FIG. 16 illustrates an example of a configuration of a double plunger pump of serial and independent drive type.

The pump broadly includes a primary subunit 200 and a secondary subunit 210.

In the primary subunit 200, the primary plunger 202 reciprocates inside the primary pump head 201. A space between the primary pump head 201 and the primary plunger 202 is sealed by a primary sealing member 203. The primary plunger 202 is reciprocally driven by a primary motor 205 via a primary linear motion mechanism 204.

A primary check valve 206 is provided between the inlet of the primary pump head 201 and a suction flow path 207. The primary check valve 206 permits the mobile phase to pass through only in a direction from the suction flow path 207 to the primary pump head 201. The outlet of the primary pump head 201 is connected to the secondary subunit 210 via a primary and secondary connection flow path 209. A primary pressure sensor 208 is provided in the primary and secondary connection flow path 209.

The primary subunit 200 and the secondary subunit 210 are mechanically almost equivalent. That is, the secondary subunit 210 includes a secondary pump head 211, a secondary plunger 212, a secondary sealing member 213, a secondary linear motion mechanism 214, a secondary motor 215, and a secondary check valve 216.

The mobile phase having passed through the secondary subunit 210 passes through the discharge flow path 217 and is fed to the subsequent stage of the liquid chromatograph. A secondary pressure sensor 218 is provided in the discharge flow path 217.

Operations of the primary motor 205 and the secondary motor 215 are controlled by a pump control controller 219. Outputs of the primary pressure sensor 208 and the secondary pressure sensor 218 are input to the pump control controller 219. The pump control controller 219 is achieved by, for example, a personal computer (PC) or a dedicated computer.

FIG. 17 illustrates an example of a speed profile of the serial type liquid feed pump. A horizontal axis illustrates a time axis, and a vertical axis illustrates the primary and secondary plunger speeds. The positive or negative plunger speeds in FIG. 17 represent the movement of the plunger in the direction of the arrow a or b illustrated in FIG. 16, respectively.

First, a negative speed is given to the primary plunger 202, the primary check valve 206 is opened, and the mobile phase is sucked into the primary pump head 201. Meanwhile, the secondary check valve 216 is closed and a positive speed is given to the secondary plunger 212, thereby obtaining a desired synthetic flow rate.

After the suction of the mobile phase to the primary pump head 201 is finished, a positive speed is given to the primary plunger 202 and a negative speed is given to the secondary plunger 212. Then the primary check valve 206 is closed and the secondary check valve 216 is opened. While the primary plunger 202 discharges the mobile phase, the secondary plunger 212 sucks the mobile phase. As a result, a value obtained by subtracting the suction amount of the secondary subunit 210 from the discharge amount of the primary subunit 200 is obtained as a combined flow rate. By appropriately controlling the ratio between the discharge amount and the suction amount, a constant synthetic flow rate can be obtained even when the motion direction of the plungers are switched.

FIG. 18 illustrates an example of a speed profile of a serial type liquid feed pump under high pressure.

In this speed profile, a pre-compression process is inserted to compress the mobile phase sucked into the primary pump head 201 up to the system pressure. The pre-compression process enables the mobile phase inside the primary pump head 201 to be already compressed to the system pressure before the primary plunger 202 enters a discharge process. As a result, as the secondary plunger 212 enters the suction process, the primary pump head 201 can immediately start discharging.

The completion timing of the pre-compression process is obtained by comparing the output of the primary pressure sensor 208 for measuring the internal pressure of the primary pump head 201, with the output of the secondary pressure sensor 218 for measuring the system pressure. In this way, a stable synthetic flow rate can be obtained even under high pressure. This method is disclosed, for example, in Patent Literature 1.

[Patent Literature 1] Japanese Patent No. 3491948
[Patent Literature 2] Specification of U.S. Pat. No. 8,535,016
[Patent Literature 3] Specification of U.S. Pat. No. 8,297,936
[Patent Literature 4] Specification of U.S. Pat. No. 8,182,680
[Patent Literature 5] US Patent Application Publication No. 2013/0336803
[Patent Literature 6] JP-A-2014-002153

SUMMARY

Despite of the efforts to improve the stability of the flow rate as described above, it has been revealed that remaining pulsation still exists. As illustrated in FIG. 19, a phenomenon in which the synthetic flow rate is lost is observed just after completion of the pre-compression on the primary side and shifting to discharge. After the mobile phase in the primary pump head 201 generates heat by adiabatic compression in the pre-compression process, the mobile phase exchanges heat with the primary pump head 201 in the discharge process and is cooled and contracted. Thus, this phenomenon is proved to be due to the occurrence as a loss of flow rate.

After cooling and contraction of the mobile phase has ended, the original flow rate and pressure recover. Such pulsation accompanying heat generation in a pre-compression process and cooling and contraction in a subsequent discharge process is called as thermal effect pulsation. In response to this problem, several methods have already been proposed for providing compensation flow rate that counteracts the pulsation (see, for example, Patent Literatures 2 to 6).

An object of the invention is to provide a liquid feeding apparatus capable of obtaining a stable flow rate even when the fluid generates heat during pre-compression, a method for controlling liquid feeding of the liquid feeding apparatus, and a liquid feeding control program of the liquid feeding apparatus.

According to an aspect of the invention, there is provided a liquid feeding apparatus which includes: a plurality of plunger pumps fluidly connected in series or in parallel between a suction flow path and a discharge flow path; and a control unit configured to control an operation of the plunger pumps. The control unit periodically operates the plunger pumps. The period includes a suction process for sucking fluid into the plunger pumps, a pre-compression process for compressing a fluid pressure in the plunger pump up to a fluid pressure in the discharge flow path for at least one of the plunger pumps, and a discharge process for discharging the fluid in the plunger pumps to the discharge flow path. The control unit performs the substantially continuous fluid discharge by at least one other plunger pump being in the discharge process when one of the plunger pumps is in the suction process. The control unit further includes a compensation flow rate calculation unit configured to calculate a positive compensation flow rate which changes with time in synchronization with the period with respect to a set flow rate. The compensation flow rate is a flow rate which compensates for (counteracts) a loss of the flow rate caused by cooling and contraction in the discharge process after the fluid in the plunger pump is compressed and heated in the pre-compression process. The compensation flow rate calculation unit calculates the compensation flow rate, on the basis of a correlation which increases the compensation flow rate with an increase in the pressure rise per unit time of the fluid in the plunger pump during the pre-compression process or on the basis of the measured rising temperature of the fluid in the plunger pump. The control unit corrects the plunger speed of the at least one plunger pump to obtain the compensation flow rate.

According to another aspect of the invention, there is provided a method for controlling liquid feeding of a liquid feeding apparatus in which a plurality of plunger pumps fluidly connected in series or in parallel between a suction flow path and a discharge flow path is periodically operated. The period includes a suction process for sucking fluid into the plunger pumps, a pre-compression process for compressing a fluid pressure in the plunger pump up to a fluid pressure in the discharge flow path for at least one of the plunger pumps, and a discharge process for discharging the fluid in the plunger pumps to the discharge flow path. The substantially continuous fluid discharge is performed by at least one other plunger pump being in the discharge process when one of the plunger pumps is in the suction process. The method includes: a compensation flow rate calculating step of calculating a positive compensation flow rate which changes with time in synchronization with the period with respect to a set flow rate; and a correction step of correcting the plunger speed of the at least one plunger pump to obtain the compensation flow rate. The compensation flow rate is a flow rate which compensates for (counteracts) a loss of the flow rate caused by cooling and contraction in the discharge process after the fluid in the plunger pump is compressed and heated in the pre-compression process. The compensation flow rate calculating step calculates the compensation flow rate, on the basis of a correlation which increases the compensation flow rate with an increase in the pressure rise per unit time of the fluid in the plunger pump during the pre-compression process or on the basis of the measured rising temperature of the fluid in the plunger pump.

The liquid feeding control program of the liquid feeding apparatus of the embodiment of the invention is a program for causing a computer to execute each step of the method for controlling liquid feeding of the liquid feeding apparatus of the embodiment of the invention.

Advantageous Effects of the Invention

In the liquid feeding apparatus, the method for controlling liquid feeding of the liquid feeding apparatus, and the liquid feeding control program of the liquid feeding apparatus according to the embodiment of the invention, a stable flow rate can be obtained even when the fluid generates heat during pre-compression.

DETAILED DESCRIPTION OF THE DRAWINGS

Figure 1:
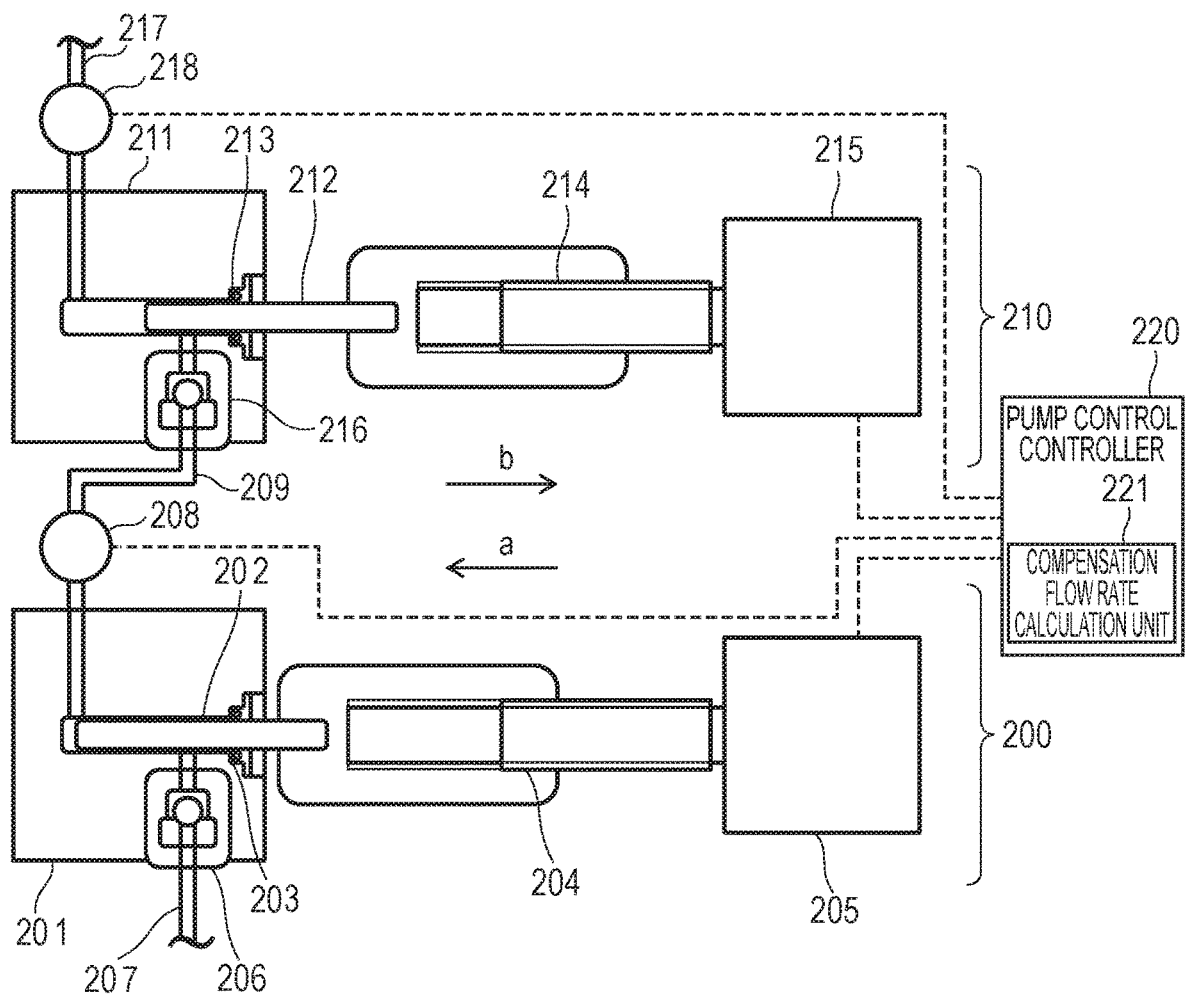
FIG. 1 is a schematic configuration diagram illustrating a configuration of an embodiment of a liquid feeding apparatus.

In the liquid feeding apparatus according to the embodiment of the invention, for example, the compensation flow rate calculation unit calculates the compensation flow rate on the basis of the correlation which increases the compensation flow rate as the pressure rise per unit time of the fluid in the plunger pump increases during the pre-compression process. For each calculation period, the compensation flow rate calculation unit calculates a pressure rise per unit time of the fluid in the plunger pump during the pre-compression process, calculates a heat generation amount per unit time proportional to the pressure rise, calculates the rising temperature after cooling over time from the rising temperature calculated in the previous calculation period, calculates a current rising temperature from the rising temperature after the cooling and the heat generation amount, calculates the thermal expansion volume of the fluid from the current rising temperature and a remaining volume capacity in the plunger pump, and calculates the compensation flow rate from a change in the thermal expansion volume per unit time.

Further, the compensation flow rate calculation unit calculates the heat generation amount, for example, assuming that the proportional coefficient between the pressure rise per unit time and the heat generation amount is $\beta T/C_p \rho$ when a thermal expansion coefficient of the fluid is set as $\beta$, a temperature is set as T, a constant pressure specific heat is set as $C_p$, and a density is set as $\rho$.

Further, for example, the compensation flow rate calculation unit sets the rising temperature after cooling to the current rising temperature for the fluid in the plunger pump during the discharge process.

Further, for example, the compensation flow rate calculation unit calculates the current rising temperature on the assumption that there is no heat generation of the fluid in the plunger pump during the suction process.

Further, for example, the compensation flow rate calculation unit calculates the pressure rise from an output of a pressure sensor which measures the pressure of the fluid in the plunger pump during the pre-compression process.

Further, the compensation flow rate calculation unit may obtain the pressure rise from the calculation on the assumption that the pressure rise is proportional to both the plunger speed of the plunger pump and the fluid pressure in the discharge flow path during the pre-compression process.

Further, in the liquid feeding apparatus of the embodiment of the invention, for example, the liquid feeding apparatus may include a thermometer which measures the fluid temperature in the plunger pump which performs the pre-compression process, and the compensation flow rate calculation unit calculates the compensation flow rate on the basis of the measured rising temperature, using the output of the thermometer. The compensation flow rate calculation unit may calculate the thermal expansion volume of the fluid from the rising temperature of the fluid and the remaining volume capacity for each calculation period in the plunger pump, and may calculate the compensation flow rate from a change in the thermal expansion volume per unit time.

Further, for example, the compensation flow rate calculation unit sets an amount of decrease in the thermal expansion volume per unit time of the fluid in the plunger pump during the discharge process as the compensation flow rate.

For example, the liquid feeding apparatus of the embodiment of the invention includes a primary plunger pump and a secondary plunger pump as the plunger pump. Between the suction flow path and the discharge flow path, a primary check valve, the primary plunger pump, a secondary check valve, and the secondary plunger pump are fluidly connected in series in that order from the suction flow path side. The primary plunger pump includes a primary pump head, a primary plunger which reciprocates inside the primary pump head in an axial direction, a primary sealing member which seals a space between the primary pump head and the primary plunger, a primary inlet flow path and a primary outlet flow path provided in the primary pump head, and a primary drive mechanism which causes the primary plunger to reciprocate. The secondary plunger pump includes a secondary pump head, a secondary plunger which reciprocates inside the secondary pump head in the axial direction, a secondary sealing member which seals a space between the secondary pump head and the secondary plunger, a secondary inlet flow path and a secondary outlet flow path provided in the secondary pump head, and a secondary drive mechanism which causes the secondary plunger to reciprocate. In the period, the suction process includes a primary suction process for moving the primary plunger in a direction away from the primary pump head to suck the fluid into the primary plunger pump, and a secondary suction process for moving the secondary plunger in a direction away from the secondary pump head to suck the fluid from the primary pump head into the secondary plunger pump head. The pre-compression process includes a primary pre-compression process for moving the primary plunger in a direction approaching the primary pump head to compress the fluid pressure in the primary pump head up to the fluid pressure of the discharge flow path. The discharge process includes a primary discharge process for moving the primary plunger in a direction approaching the primary pump head after the primary pre-compression process to discharge the fluid in the primary pump head to the discharge flow path, while passing through the secondary pump head, and a secondary discharge process for moving the secondary plunger in a direction approaching the secondary pump head to discharge the fluid in the secondary pump head to the discharge flow path. The primary discharge process is performed almost during the secondary suction process, and the secondary discharge process is performed almost during the primary suction process and during the primary pre-compression process. The control unit corrects at least one of the speed of the primary plunger during the primary discharge process and the speed of the secondary plunger during the secondary suction process in order to obtain the compensation flow rate.

Here, the expressions "the primary discharge process is performed almost during the secondary suction process", and "the secondary discharge process is performed almost during the primary suction process and during the primary pre-compression process" mean that there is a case where apart of the period of the primary discharge process overlap a part of the period of the secondary discharge process. For example, a so-called hand-over section may be provided in which the plunger speed of one plunger pump during the discharge process is gradually reduced at the ending time of the discharge process, and at the same time, the other plunger pump is switched from the pre-compression process or the suction process to the discharge process to gradually increase the plunger speed.

In this aspect, for example, the control unit may provide the compensation flow rate by increasing the speed of the primary plunger during the primary discharge process.

Further, in this aspect, the control unit may provide the compensation flow rate by reducing the speed of the secondary plunger during the secondary suction process.

Further, in this aspect, the control unit may provide the compensation flow rate by increasing the speed of the primary plunger during the primary discharge process and simultaneously increasing the speed of the secondary plunger during the secondary suction process, and by setting the increase amount of the speed of the primary plunger to be larger than the increase amount of the speed of the secondary plunger.

In the liquid feeding apparatus according to the embodiment of the invention, for example, the plurality of plunger pumps is fluidly connected in parallel between the suction flow path via the inlet check valves, and the discharge flow path via the output check valves. The plunger pump includes a pump head, a plunger reciprocating in the pump head in the axial direction, a sealing member which seals a space between the pump head and the plunger, an inlet flow path and an outlet flow path provided in the pump head, and a drive mechanism which causes the plunger to reciprocate. The period includes the suction process for moving the plunger in a direction away from the pump head to suck the fluid from the inlet flow path into the pump head, the pre-compression process for moving the plunger in the direction approaching the pump head to compress the fluid pressure in the pump head to the fluid pressure of the outlet flow path, and the discharge process for further moving the plunger in the direction approaching the pump head after the pre-compression process to discharge the fluid in the pump head to the outlet flow path. The control unit corrects the plunger speed of at least one plunger pump to obtain the compensation flow rate.

In this aspect, for example, the control unit may provide the compensation flow rate by increasing the plunger speed of the plunger pump during the discharge process.

In the method for controlling liquid feeding of the liquid feeding apparatus according to the embodiment of the invention, for example, the compensation flow rate calculating step is a step of calculating the compensation flow rate on the basis of the correlation, and for each calculation cycle, the method includes a pressure rise calculating step of calculating a pressure rise per unit time of the fluid in the plunger pump during the pre-compression process, a heat generation amount calculating step of calculating a heat generation amount per unit time proportional to the pressure rise, an after-cooling temperature calculating step of calculating the rising temperature after cooling over time from the rising temperature calculated in the previous calculation period, a current temperature calculating step for calculating a current rising temperature from the rising temperature after the cooling and the heat generation amount, a thermal expansion volume calculating step of calculating a thermal expansion volume of the fluid from the current rising temperature and a remaining volume capacity in the plunger pump, and a compensation flow rate calculating step of calculating the compensation flow rate from a change in the thermal expansion volume per unit time.

Further, in the heat generation amount calculating step, the heat generation amount is calculated, for example, assuming that a proportional coefficient between the pressure rise per unit time and the heat generation amount is $\beta T/C_p \rho$ when a thermal expansion coefficient of the fluid is set as $\beta$, a temperature is set as T, a constant pressure specific heat is set as $C_p$, and a density is set as $\rho$.

Further, in the current temperature calculating step, for example, for the fluid in the plunger pump during the discharge process, the rising temperature after cooling is set as the current rising temperature.

Further, in the current temperature calculating step, for example, during the suction process, the current rising temperature is calculated on the assumption that there is no heat generation of the fluid in the plunger pump.

Further, in the compensation flow rate calculating step, for example, an amount of decrease in the thermal expansion volume per unit time of the fluid in the plunger pump during the discharge process is set as a compensation flow rate.

Further, in the pressure rise calculating step, for example, the pressure rise is calculated from the output of a pressure sensor which measures the pressure of the fluid in the plunger pump during the pre-compression process.

Further, in the pressure rise calculating step, the pressure rise may be obtained from the calculation on the assumption that the pressure rise is proportional to both the plunger speed of the plunger pump process and the fluid pressure in the discharge flow path during the pre-compression.

Further, in the method for controlling liquid feeding of the liquid feeding apparatus according to an embodiment of the invention, for example, the pressure rise calculating step may be a step of calculating the compensation flow rate on the basis of the measured rising temperature, using the output of a thermometer that measures the fluid temperature in the plunger pump for performing the pre-compression process. The pressure rise calculating step may include, for each calculation cycle, a thermal expansion volume calculating step of calculating a thermal expansion volume of the fluid from a rising temperature and a remaining volume capacity of the fluid in the plunger pump, and a compensation flow rate calculating step of calculating the compensation flow rate from a change in the thermal expansion volume per unit time.

Further, in the compensation flow rate calculating step, for example, an amount of decrease in the thermal expansion volume per unit time of the fluid in the plunger pump during the discharge process is set as a compensation flow rate.

Also, in the correcting step, for example, the compensation flow rate is given by increasing the plunger speed of the plunger pump during the discharge process.

Further, in the correcting step, the compensation flow rate may be given by reducing the plunger speed of the plunger pump during the suction process.

Further, in the above correcting step, the compensation flow rate may be given, by increasing the plunger speed of the plunger pump during the discharge process and at the same time increasing the plunger speed of the plunger pump during the suction process, and by setting the increase amount of the plunger speed of the plunger pump during the discharge process to be larger than the increase amount of the plunger speed of the plunger pump during the suction process.

An embodiment of the invention will be described with reference to the drawings.

Figure 2:
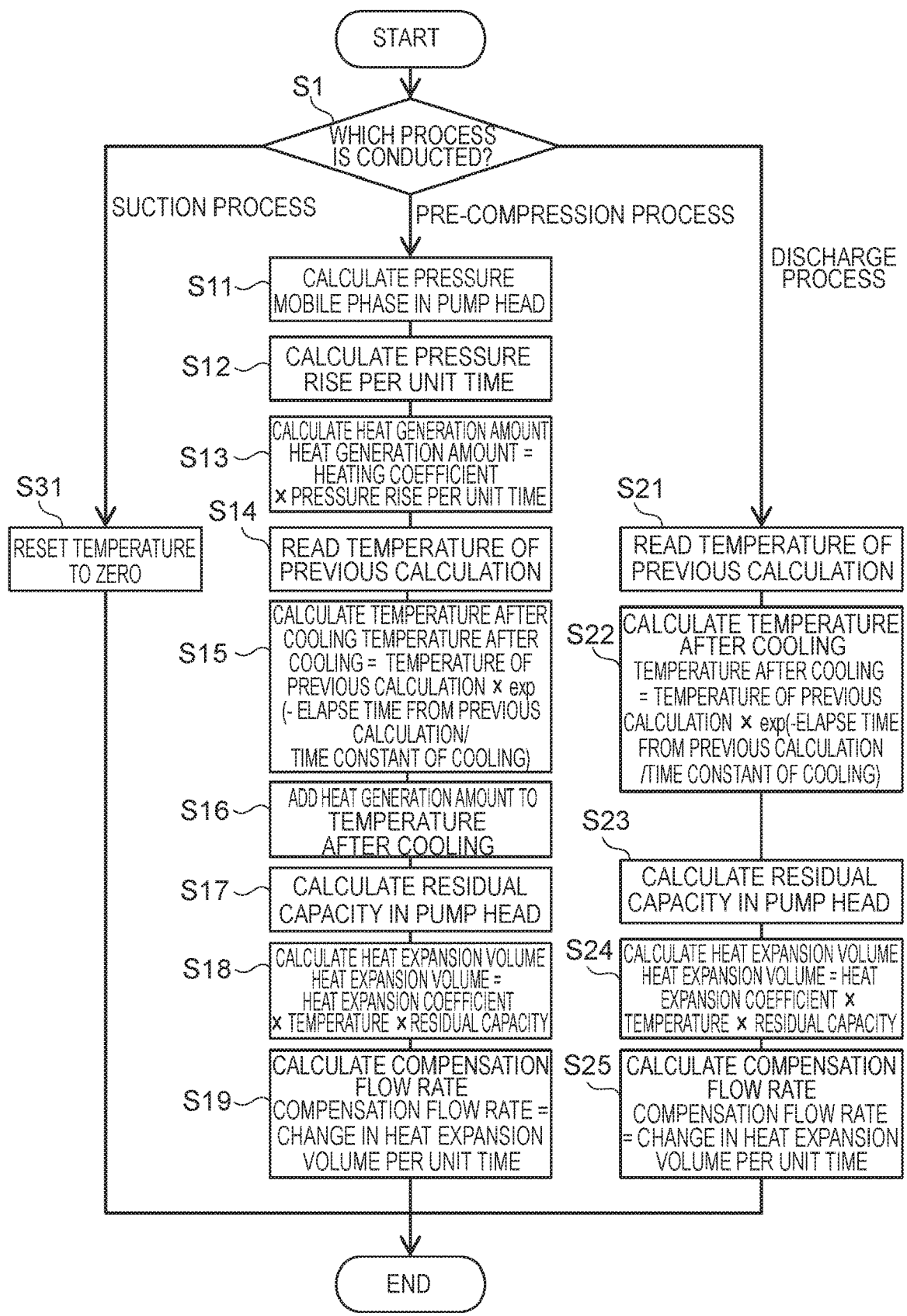
FIG. 2 is a calculation flow chart of a compensation flow rate illustrating an embodiment of a method for controlling liquid feeding of a liquid feeding apparatus.
Figure 3:
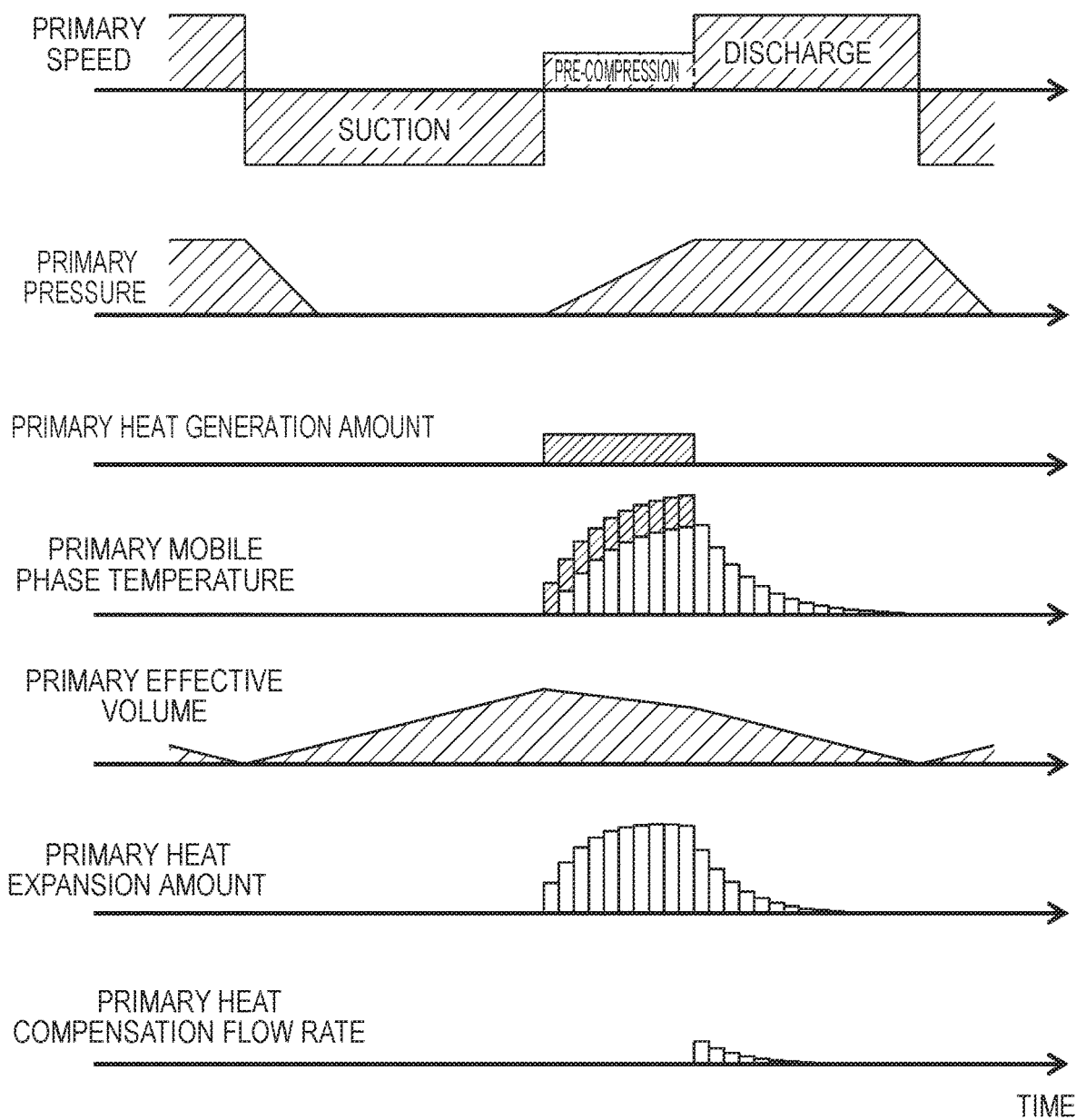
FIG. 3 is a graph illustrating a calculating process of the compensation flow rate in the embodiment.

FIG. 1 illustrates a schematic configuration diagram of an embodiment of a liquid feeding apparatus. FIG. 2 illustrates a calculation flow chart of the compensation flow rate in an embodiment of the method for controlling liquid feeding of the liquid feeding apparatus. FIG. 3 illustrates a graph for a calculating process of the compensation flow rate in this embodiment.

Figure 16:
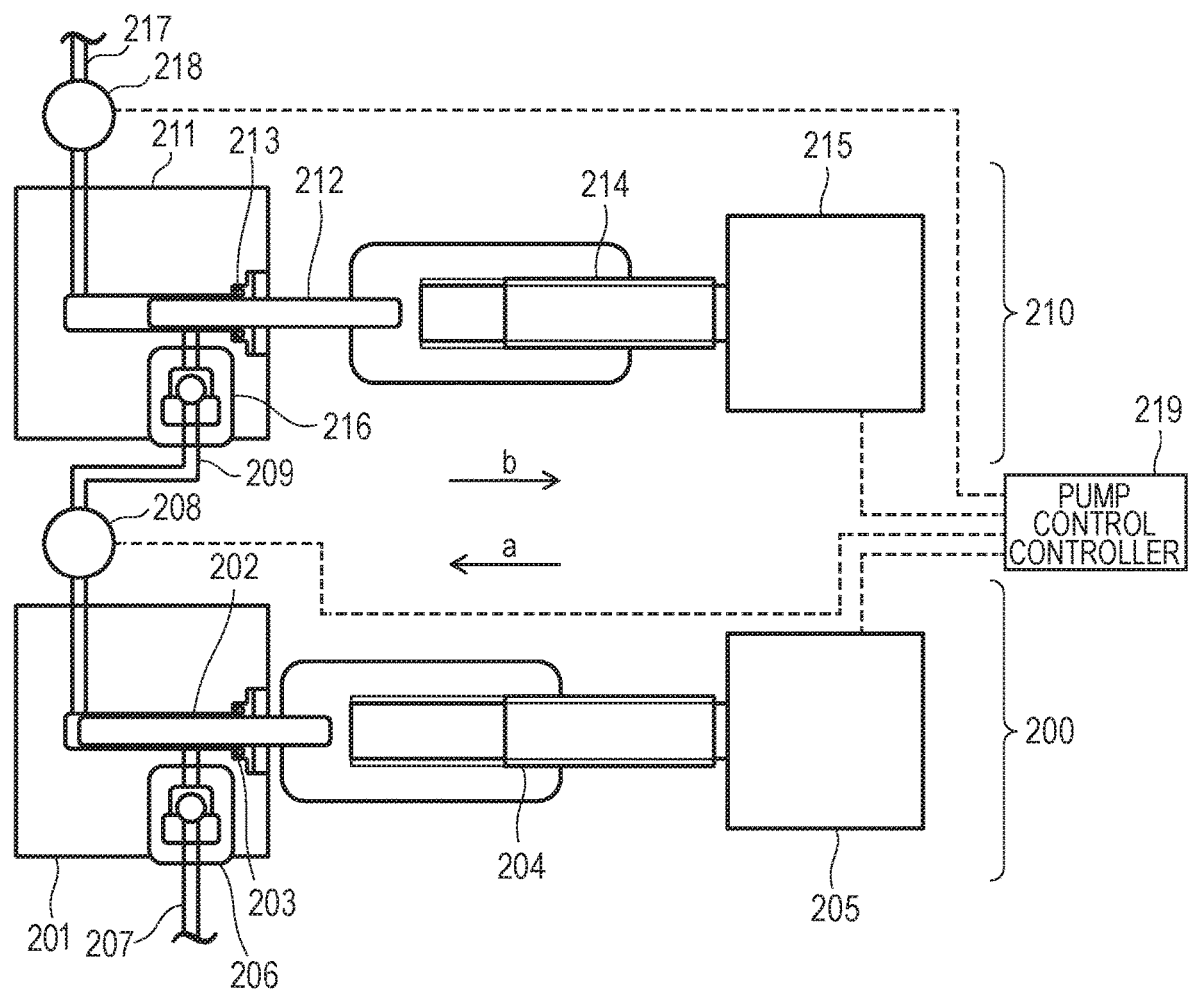
FIG. 16 is a schematic configuration diagram illustrating an example of a configuration of a serial type double plunger pump.
Figure 17:
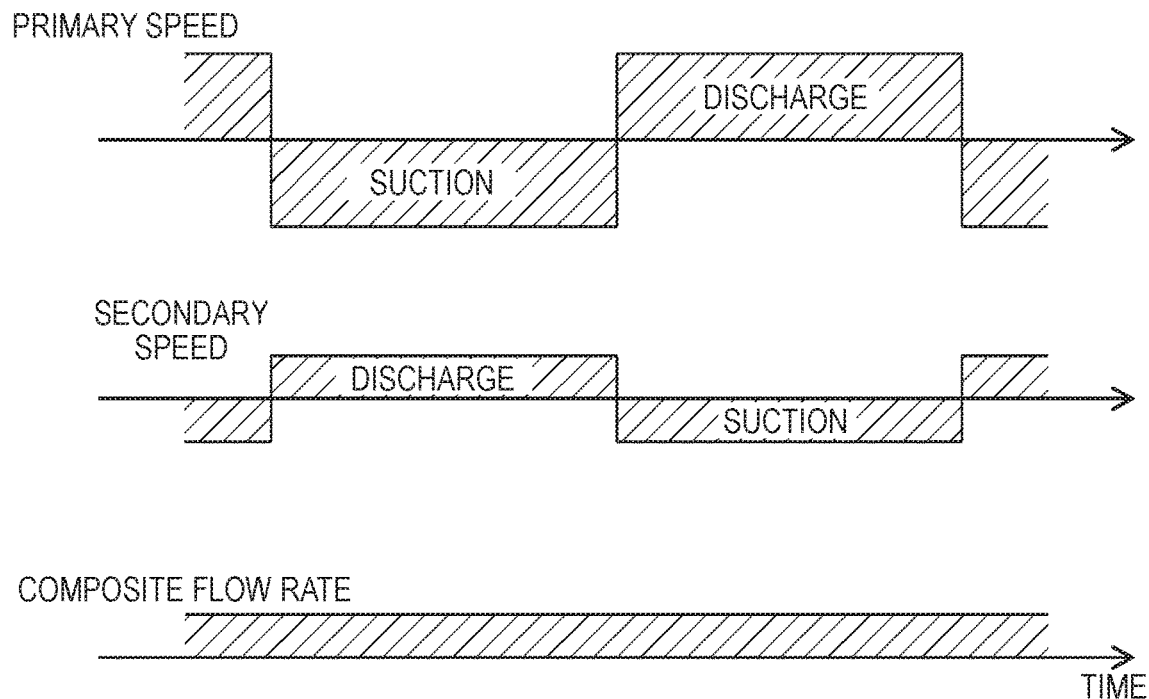
FIG. 17 is a graph illustrating an example of a speed profile of the liquid feeding apparatus of FIG. 16.
Figure 18:
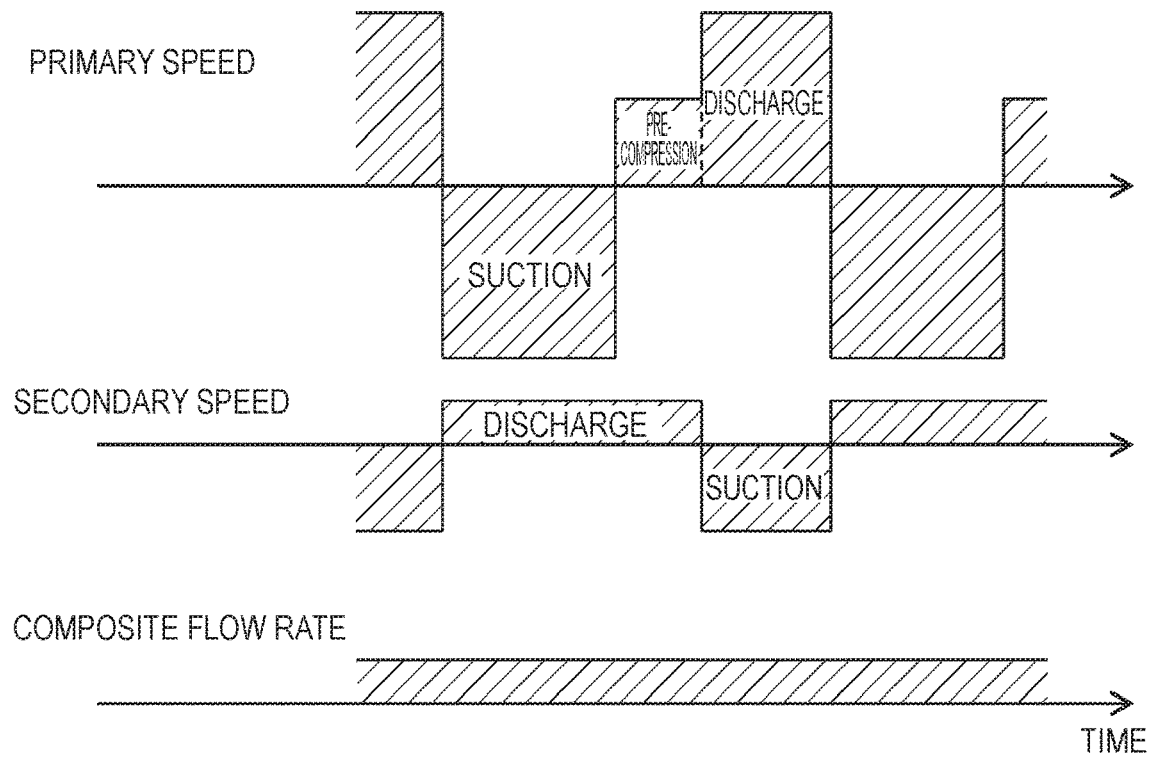
FIG. 18 is a graph illustrating an example of the speed profile of the liquid feeding apparatus of FIG. 16 under high pressure.
Figure 19:
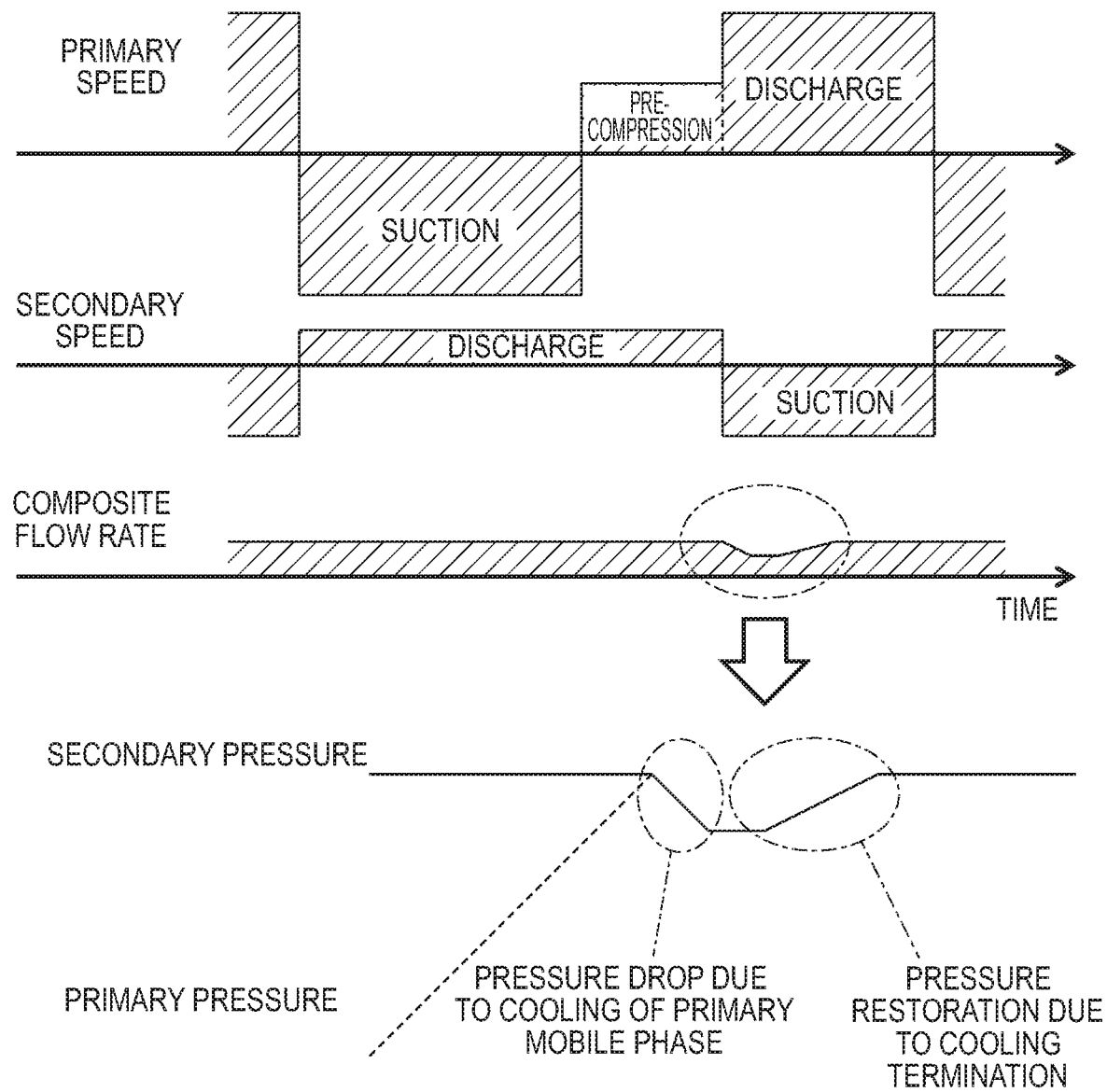
FIG. 19 is a graph illustrating a malfunction of a serial type double plunger pump.

As illustrated in FIG. 1, as compared with the liquid feeding apparatus illustrated in FIG. 16, in the liquid feeding apparatus of this embodiment, a pump control controller 220 (control unit) is provided with a compensation flow rate calculation unit 221. Other configurations of the liquid feeding apparatus of this embodiment are the same as those of the liquid feeding apparatus illustrated in FIG. 16.

The compensation flow rate calculation unit 221 calculates a positive compensation flow rate which changes with time in synchronization with the operation cycle of a primary plunger 202 and a secondary plunger 212 with respect to the set flow rate. The compensation flow rate is a flow rate which compensates for (counteracts) a loss of flow rate due to the fact that the mobile phase (fluid) in the primary pump head 201 of the primary subunit 200 is cooled and contracted in the discharge process after compressed and heated in the pre-compression process. The compensation flow rate calculation unit 221 calculates the compensation flow rate on the basis of a correlation that increases the compensation flow rate as the pressure rise per unit time of the mobile phase in the primary pump head 201 increases during the pre-compression process.

The calculating procedure of the compensation flow rate will be described with reference to FIGS. 1 to 3.

The compensation flow rate calculation unit 221 determines which process of the pre-compression process, the discharge process, and the suction process the primary subunit 200 is in (step S1).

When the primary plunger 202 of the primary subunit 200 enters the pre-compression process, the pressure in the primary pump head 201 rises. The compensation flow rate calculation unit 221 measures the pressure in the primary pump head 201 from the output of the primary pressure sensor 208 (step S11).

The compensation flow rate calculation unit 221 calculates the pressure rise per unit time in a certain calculation period (step S12). Further, a heat generation amount proportional to the pressure rise is obtained (step S13). When the thermal expansion coefficient of the mobile phase (fluid) is set as $\beta$, the temperature is set as T, the constant pressure specific heat is set as $C_p$, and the density is set as $\rho$, the proportional coefficient (the amount of temperature rise per unit pressure rise) is calculated to be $\beta T/(C_p \rho)$ by thermodynamics theory.

The compensation flow rate calculation unit 221 calculates that the rising temperature obtained in the previous calculation cycle is cooled. First, the rising temperature obtained in the previous calculation cycle is read (step S14). Next, the rising temperature after cooling is calculated (step S15). The degree of cooling is obtained by the exponential attenuation calculation from a cooling time constant (known) of the mobile phase and a time width of the calculation period. Further, the cooling speed over time depends on the physical property values of the mobile phase and an inner diameter dimension of the primary pump head 201. For example, the cooling speed is delayed when the inner diameter dimension of the primary pump head 201 is large. Also, different values of cooling speed may be assigned for each spatial portion inside the primary pump head 201. Further, the cooling speed may be increased as the spatial portion inside the primary pump head 201 is closer to the wall surface.

Next, the compensation flow rate calculation unit 221 adds the heat generation amount obtained in step S13 to the rising temperature after cooling obtained in step S15 (step S16). In this way, the compensation flow rate calculation unit 221 calculates both the heat generation and the cooling of the mobile phase during the primary pre-compression process, thereby obtaining the current rising temperature of the mobile phase in the primary pump head 201.

The order of the calculation of the heat generation and the cooling of the mobile phase in the primary pump head 201 may be any order. For example, the rising temperature after cooling may be calculated before the heat generation amount is calculated, or the heat generation amount and the rising temperature after cooling may be calculated in parallel.

Next, the compensation flow rate calculation unit 221 calculates the remaining volume capacity in the primary pump head 201 (step S17), and calculates the thermal expansion volume of the mobile phase (step S18). By calculating the product of the current rising temperature of the mobile phase, the volume inside the primary pump head 201, and the thermal expansion coefficient of the mobile phase, it is possible to obtain the thermal expansion amount of the mobile phase.

The compensation flow rate calculation unit 221 calculates the compensation flow rate (step S19). The compensation flow rate is obtained on the basis of the change in the thermal expansion volume per unit time.

The process returns to step S1. Steps S11 to S19 are repeated while the primary subunit 200 is in the primary pre-compression process.

When the primary subunit 200 enters the discharge process, the rise in the primary pressure is stopped. That is, the heat generation of the mobile phase disappears and only cooling is performed. Further, the amount of thermal expansion of the mobile phase in the primary pump head 201 decreases monotonously.

When the primary subunit 200 is in the discharge process, the compensation flow rate calculation unit 221 reads the rising temperature of the previous calculation (step S21), and calculates the rising temperature after cooling of the mobile phase by exponential attenuation calculation (step S22).

The compensation flow rate calculation unit 221 calculates the remaining volume capacity in the primary pump head 201 (step S23), and calculates the thermal expansion volume of the mobile phase (step S24). At this time, the compensation flow rate calculation unit 221 sets the rising temperature after cooling calculated in step S22 as the current rising temperature.

The compensation flow rate calculation unit 221 calculates the compensation flow rate (step S25). The compensation flow rate calculation unit 221 sets the decrease amount of the thermal expansion volume per unit time of the mobile phase in the primary pump head 201 as the compensation flow rate. The compensation flow rate is a positive value.

The pump control controller 220 corrects the speed of the primary plunger 202 or the speed of the secondary plunger 212 or both so that the positive compensation flow rate calculated by the compensation flow rate calculation unit 221 is obtained (correcting step). As a result, the thermal effect pulsation is canceled out. This correcting step is performed only during the discharge process.

When the primary subunit 200 enters the suction process, the compensation flow rate calculation unit 221 resets the rising temperature of the mobile phase in the primary pump head 201 to zero (step S31).

Each step of the above-described embodiment can be achieved, by preparing a program for processing each step and executing the program using a computer.

Figure 4:
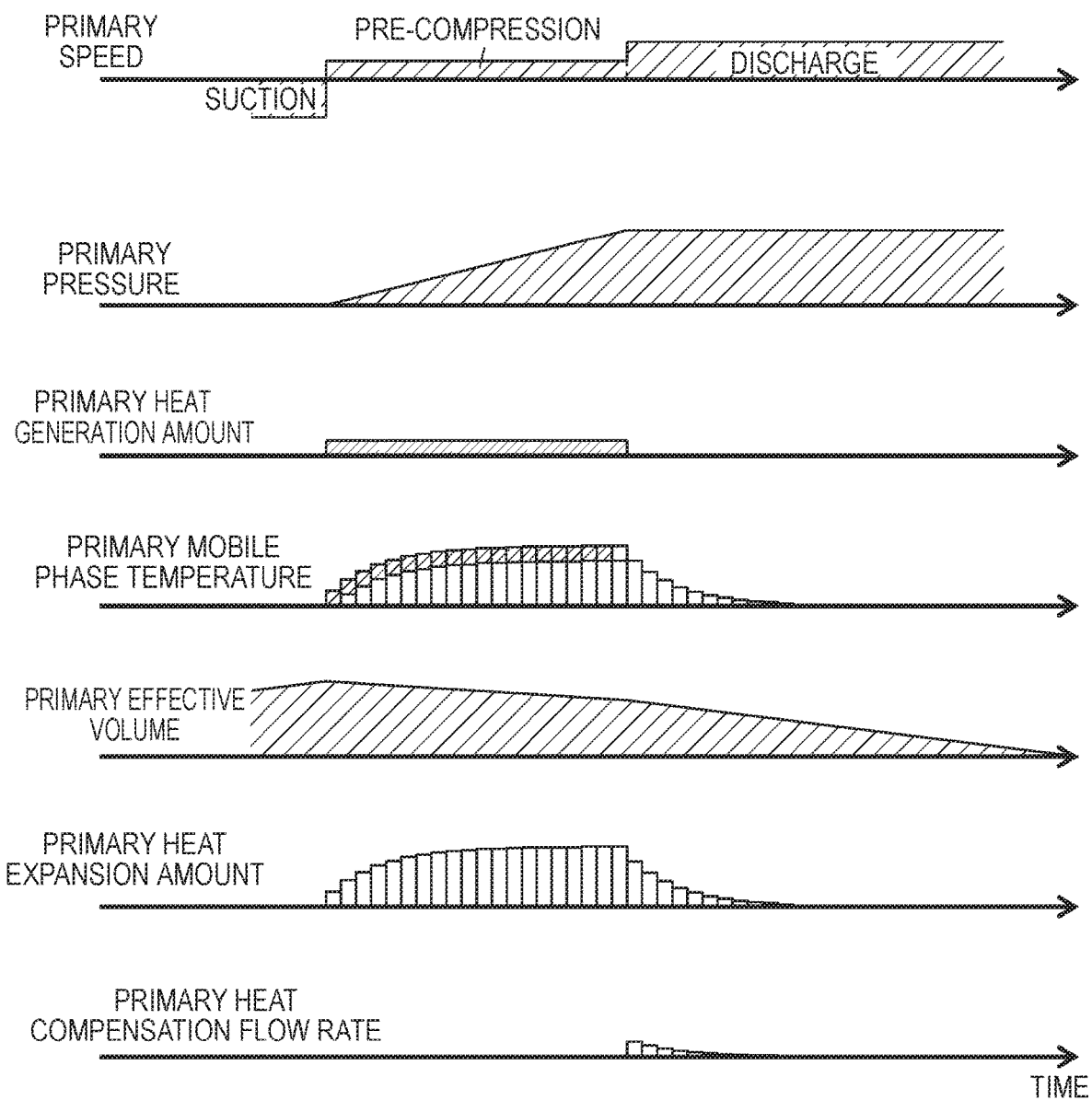
FIG. 4 is a graph illustrating the calculating process of the heat compensation flow rate when the liquid is fed at a half flow rate of FIG. 3 by the embodiment of FIG. 1.

FIG. 4 is a graph illustrating the calculating procedure of the heat compensation flow rate when the liquid is fed at a half flow rate in FIG. 3 by the embodiment of the liquid feeding apparatus illustrated in FIG. 1.

As in the case of FIG. 3, the compensation flow rate calculation unit 221 calculates both the heat generation and the cooling of the mobile phase in the primary pump head 201 during the primary pre-compression process, and calculates only cooling during discharge. Since the slope of the rise of the primary pressure is half that of FIG. 3, the heat generation amount per unit time of the mobile phase during the primary pre-compression process is also halved. Therefore, the arrival temperature of the primary mobile phase is calculated to be lower than in the case of FIG. 3. As a result, the compensation flow rate also decreases and an appropriate compensation flow rate is obtained.

Figure 5:
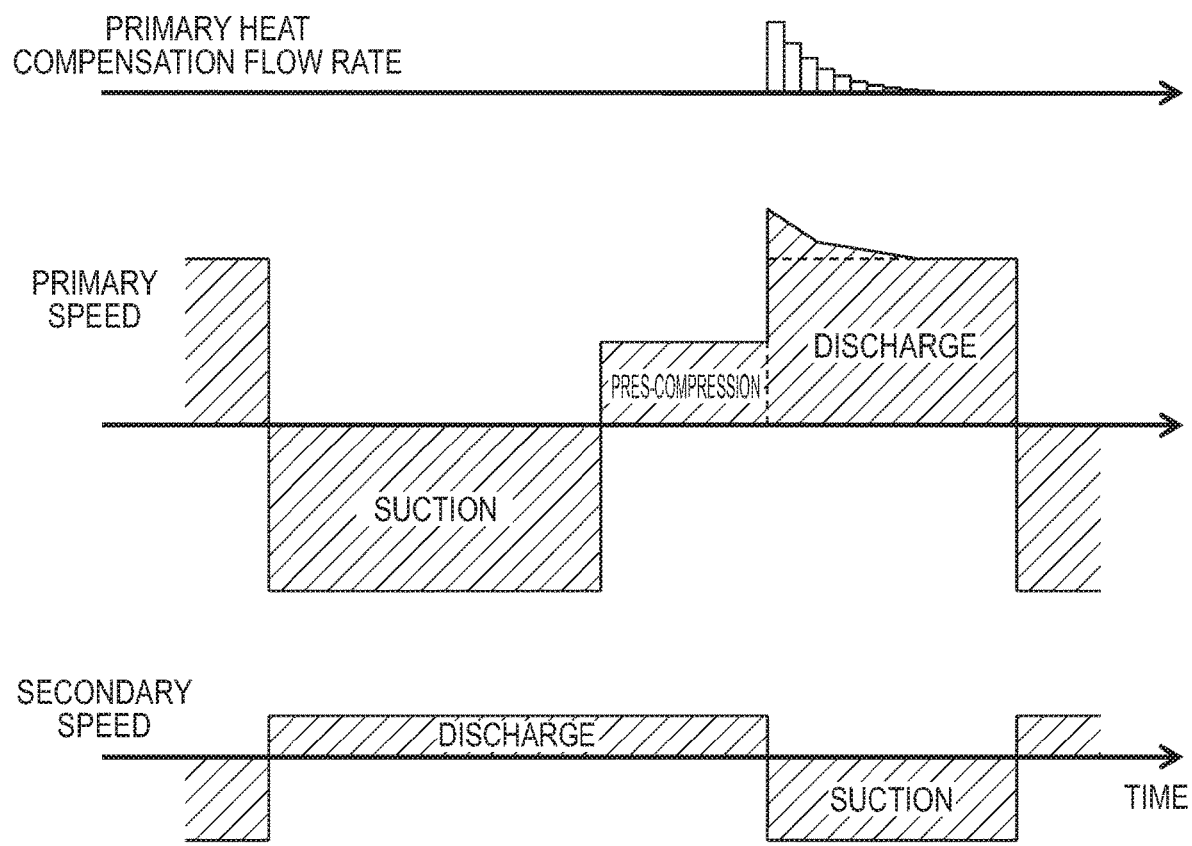
FIG. 5 is a graph illustrating an example of a method of applying a calculated compensation flow rate to a plunger speed.
Figure 6:
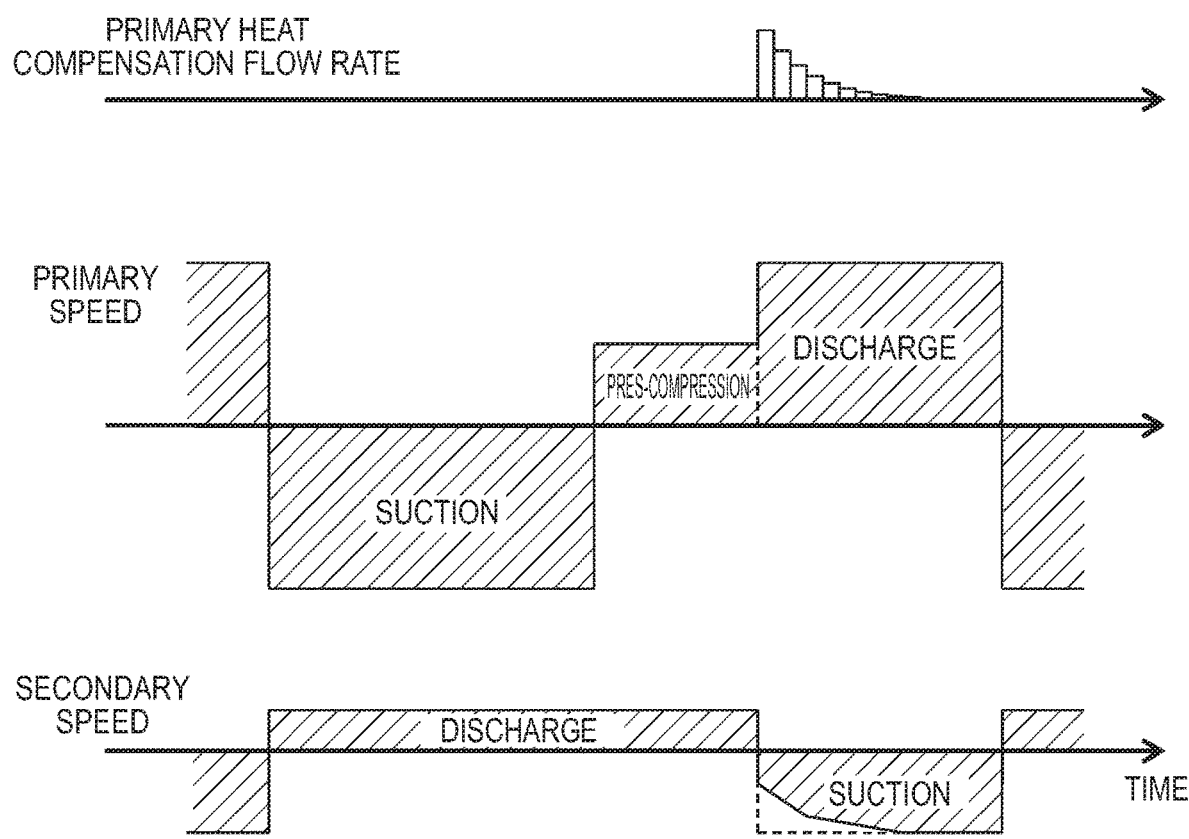
FIG. 6 is a graph illustrating another example of a method of applying the calculated compensation flow rate to the plunger speed.
Figure 7:
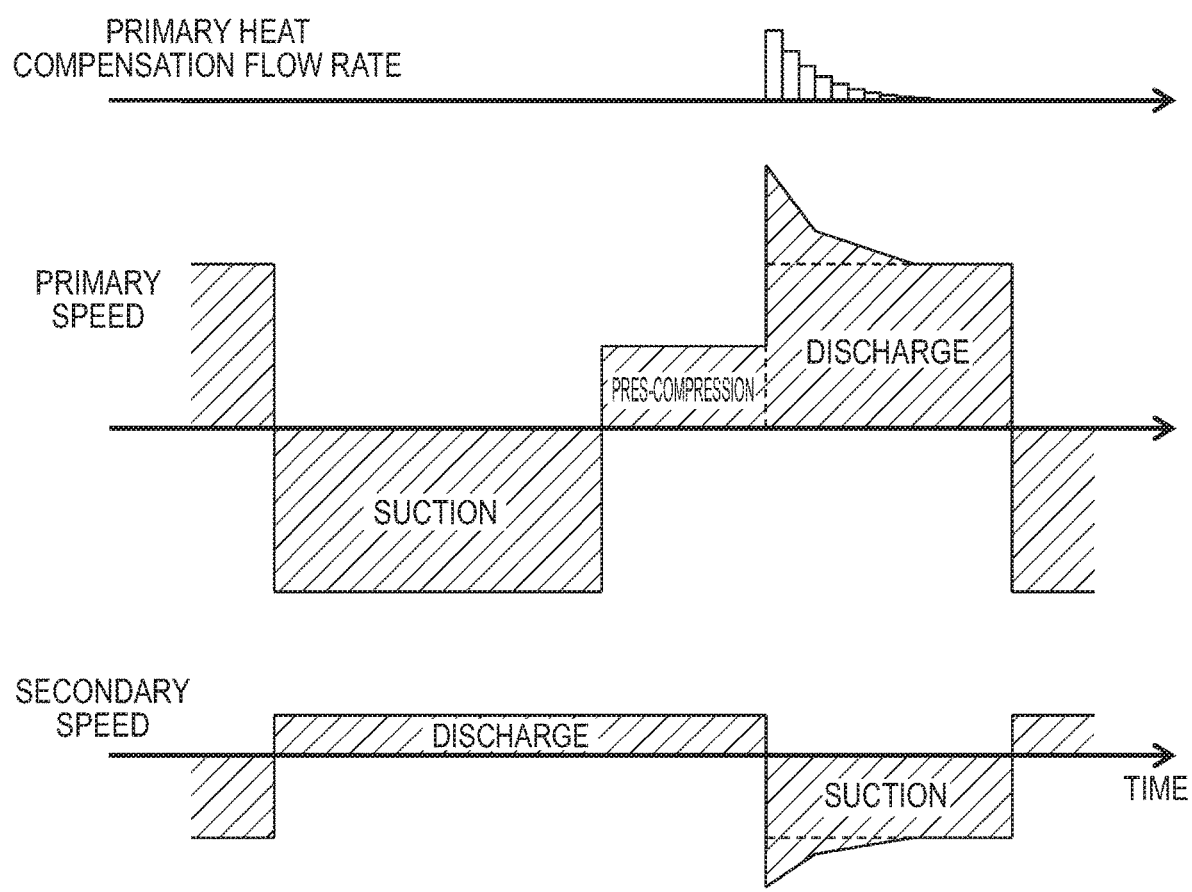
FIG. 7 is a graph illustrating still another example of a method of applying the calculated compensation flow rate to the plunger speed.

FIGS. 5 to 7 illustrate an example of a method for applying the calculated compensation flow rate to the plunger speed.

In FIG. 5, the pump control controller 220 increases the discharge amount of the primary subunit 200 by increasing the primary speed (the speed of the primary plunger 202) in the primary discharge process, thereby compensating for the flow rate.

In FIG. 6, the pump control controller 220 reduces the suction amount of the secondary subunit 210 by reducing the secondary speed (the speed of the secondary plunger 212) in the secondary suction process, thereby compensating for the flow rate.

In FIG. 7, the pump control controller 220 increases the primary speed (the speed of the primary plunger 202) in the primary discharge process to increase the discharge amount of the primary subunit 200, and at the same time, increases the secondary speed (the speed of the secondary plunger 212) in the secondary suction process to increase the suction amount of the secondary subunit 210. However, a desired flow compensation amount is obtained by setting the increase amount of the primary speed to be larger than the increase amount of the secondary speed. That is, the incremental amount of the discharge amount of the primary subunit 200 is made to be larger than the increment amount of the suction amount of the secondary subunit 210. The method of FIG. 7 can also be applied to a drive mechanism type (a one-motor cam system, a one-motor ball screw system, etc.) in which the speed ratio between the primary and the secondary is fixed.

Further, when the hand-over section is provided as described above, the time just after the start of the discharge process of the primary subunit 200 overlaps the time just before the end of the discharge process of the secondary subunit 210. Also, the timing just before the end of the discharge process of the primary subunit 200 overlaps the time just after the start of the discharge process of the secondary subunit 210.

In this case, in order to obtain a desired flow compensation amount, in the hand-over section which is the timing just after the start of the discharge process of the primary subunit 200 and is also the timing just before the end of the discharge process of the secondary subunit 210, for example, it is possible to select one of (A) an increase in the speed (the discharge amount of the primary subunit 200) of the primary plunger 202, (B) an increase in the speed (the discharge amount of the secondary subunit 210) of the secondary plunger 212, and (C) an increase in the speed of the primary plunger 202 and an increase in the speed of the secondary plunger 212.

The above method (C) can also be achieved in a drive mechanism type in which the speed ratio between the primary plunger 202 and the secondary plunger 212 is fixed. However, in this case, the hand-over section becomes shorter than in a case where the plunger speed is not corrected.

Figure 8:
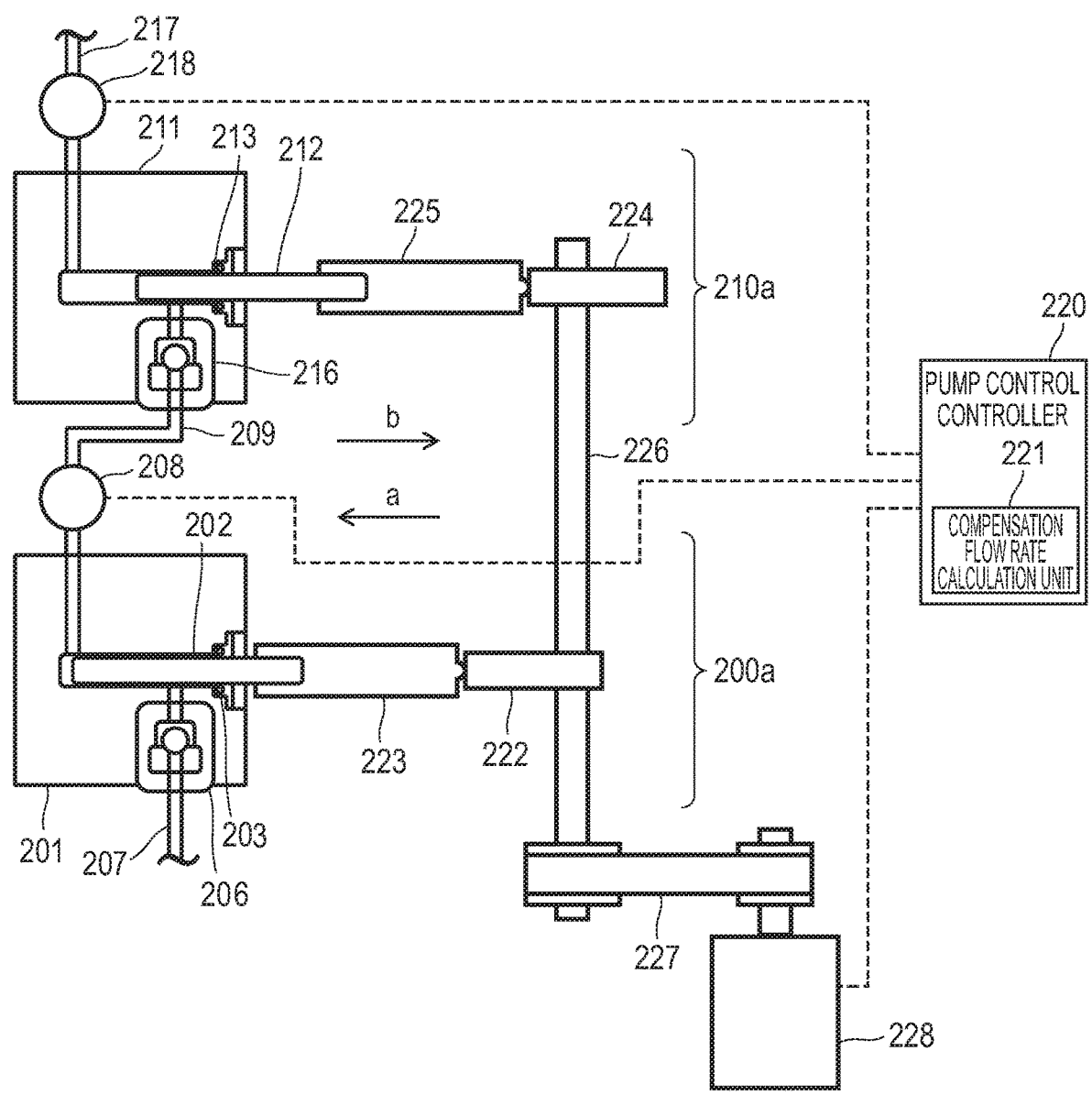
FIG. 8 is a schematic configuration diagram illustrating a configuration of an embodiment of a liquid feeding apparatus of one-motor cam type.

FIG. 8 illustrates an embodiment of a liquid feeding apparatus of the one-motor cam type. In FIG. 8, portions that perform the same function as in FIG. 1 are denoted by the same reference numerals.

In a primary subunit 200a, the primary plunger 202 reciprocates together with a primary crosshead 223 by the rotational motion of the primary cam 222. Further, in a secondary subunit 210a, the secondary plunger 212 reciprocates together with a secondary crosshead 225 by the rotational motion of the secondary cam 224.

The primary cam 222 and the secondary cam 224 are attached to one shaft 226. The shaft 226 is rotated by a motor 228 via a belt 227. The rotation of the motor 228 is controlled by the pump control controller 220.

Figure 9:
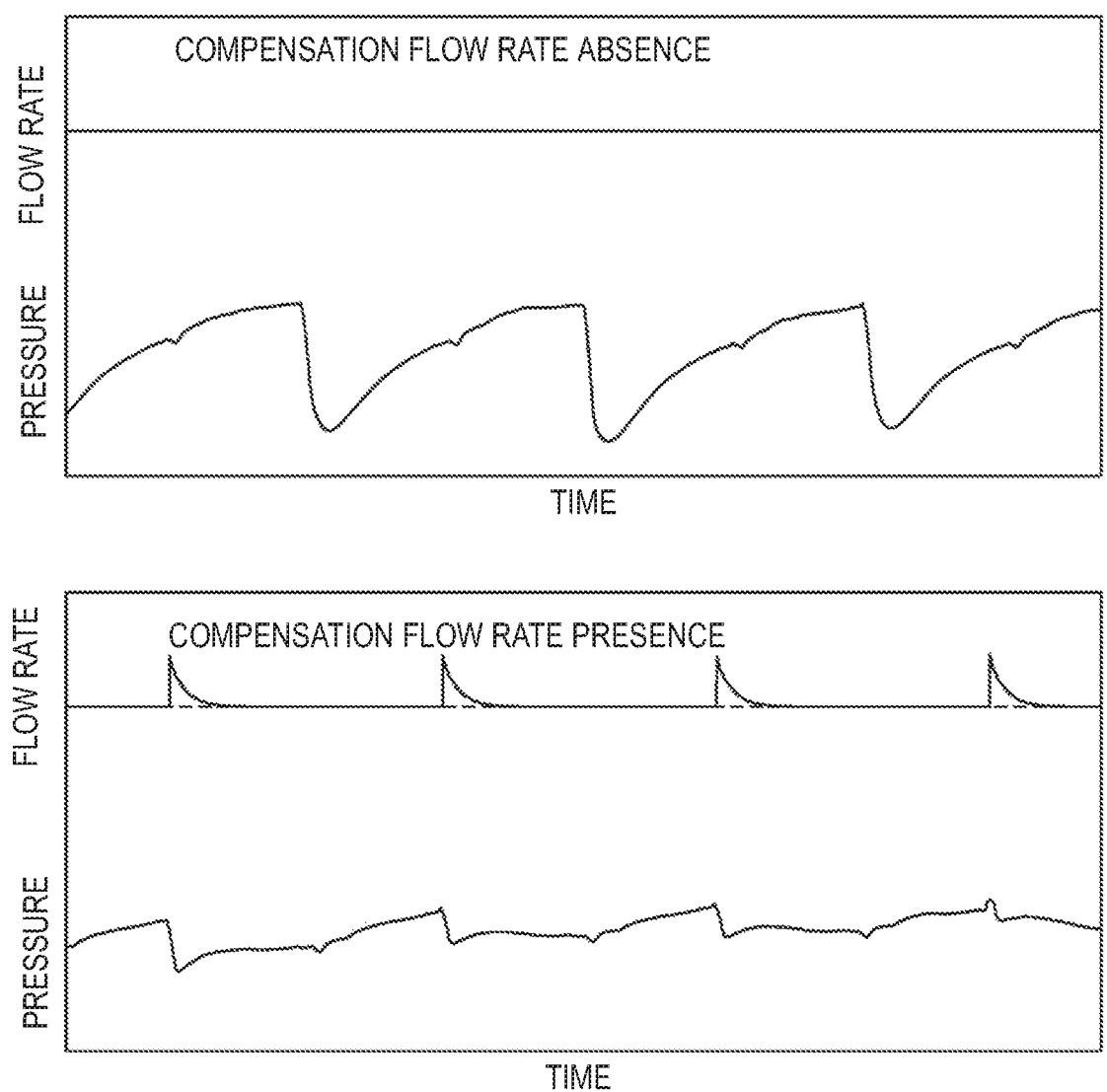
FIG. 9 is data illustrating the effect of the embodiment.

FIG. 9 is data illustrating the effect of the embodiment of the liquid feeding apparatus illustrated in FIG. 1. In FIG. 9, a horizontal axis represents the time. A vertical axis represents the pressure and the flow rate set value of the mobile phase in the discharge flow path.

The upper graph of FIG. 9 is a pressure waveform in a case where the thermal compensation flow rate is not given. Acyclic drop in pressure is observed. This is a thermal effect pulsation accompanying the cooling of the mobile phase.

The lower graph of FIG. 9 is a pressure waveform in a case where a compensation flow rate according to an embodiment of the liquid feeding apparatus is given. A positive compensation flow rate is added just after the pre-compression. As a result, the drop in pressure as seen in the upper graph is counteracted, and the liquid feeding stability is improved.

Figure 10:
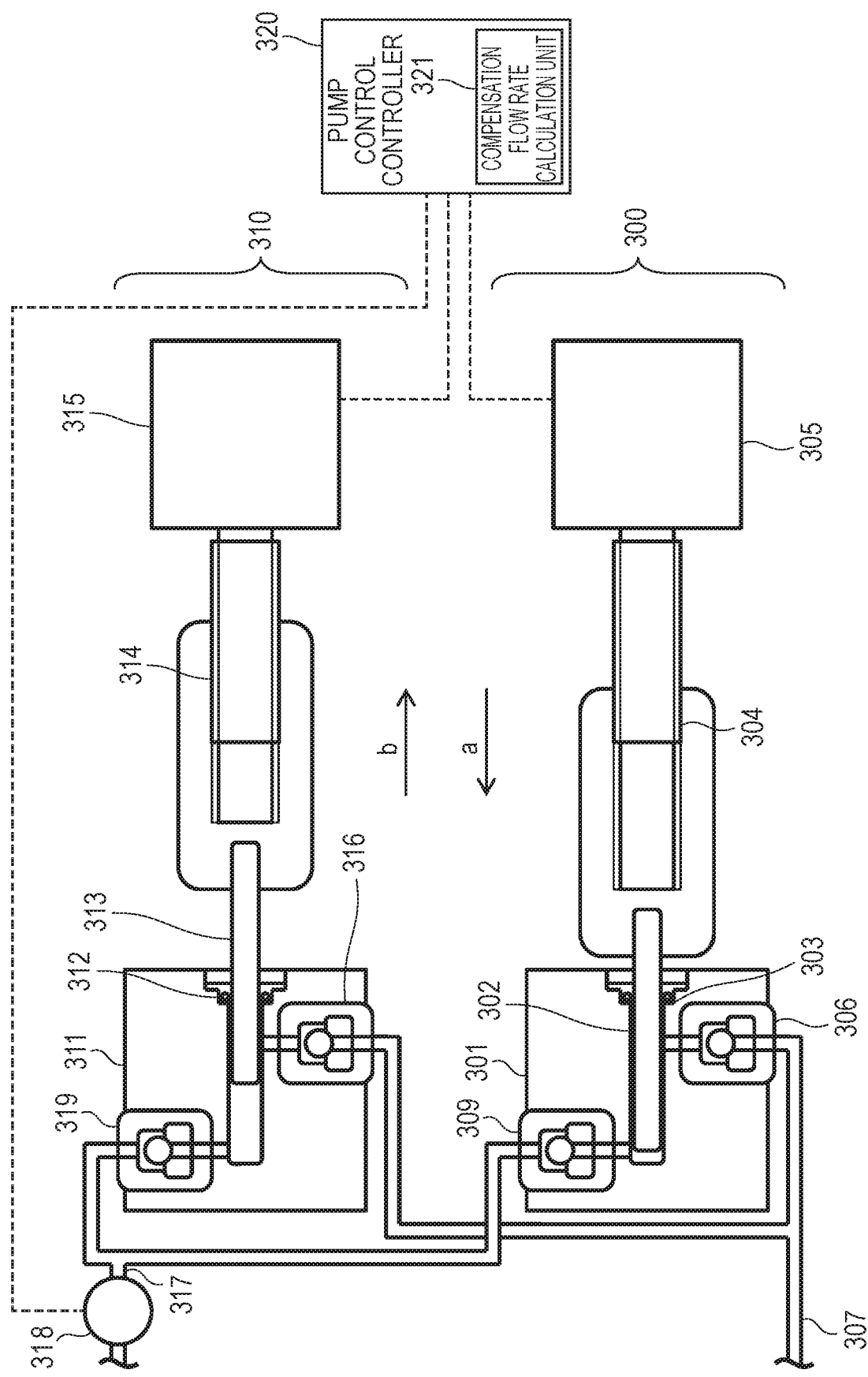
FIG. 10 is a schematic configuration diagram illustrating the configuration of another embodiment of the liquid feeding apparatus.

FIG. 10 illustrates a configuration of another embodiment of the liquid feeding apparatus. This embodiment is a so-called parallel type pump.

The pump mainly includes a right subunit 300 and a left subunit 310.

The right subunit 300 and the left subunit 310 are mechanically almost equivalent to the primary subunit 200 and the secondary subunit 210 described with reference to FIG. 1, while a right outlet check valve 309 and a left outlet check valve 319 are additionally provided.

That is, the right subunit 300 includes a right pump head 301, a right plunger 302, a right sealing member 303, a right linear motion mechanism 304, a right motor 305, a right inlet check valve 306, and a right outlet check valve 309.

Further, the left subunit 310 includes a left pump head 311, a left plunger 312, a left sealing member 313, a left linear motion mechanism 314, a left motor 315, a left inlet check valve 316, and a left outlet check valve 319.

The right subunit 300 and the left subunit 310 are fluidly connected in parallel between the suction flow path 307 and the discharge flow path 317. The right inlet check valve 306 and the left inlet check valve 316 are connected to the suction flow path 307. The right outlet check valve 309 and the left outlet check valve 319 are connected to the discharge flow path 317. A discharge flow path pressure sensor 318 is provided in the discharge flow path 317.

Operations of the right motor 305 and the left motor 315 are controlled by the pump control controller 320. The output of the discharge flow path pressure sensor 318 is input to the pump control controller 320. The pump control controller 320 is achieved by, for example, a personal computer (PC) or a dedicated computer. The pump control controller 320 includes a compensation flow rate calculation unit 321.

Figure 11:
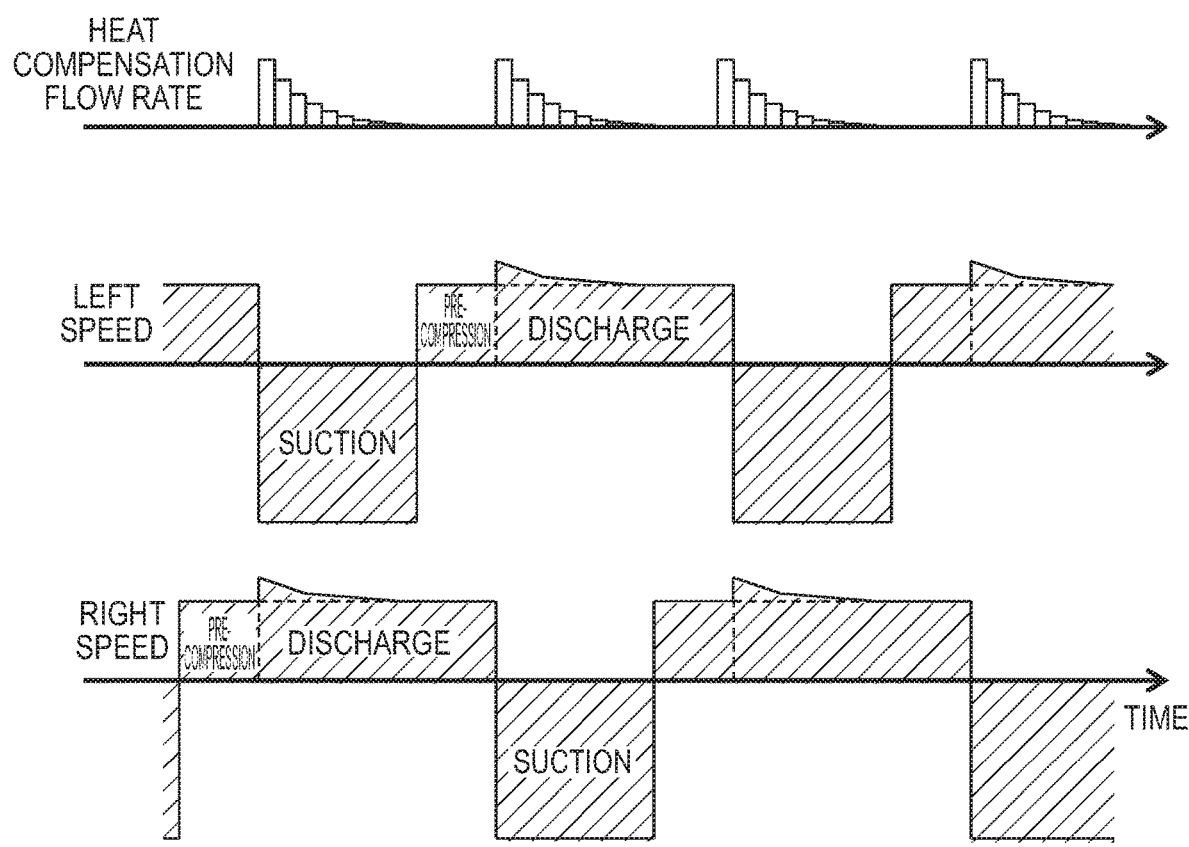
FIG. 11 is a graph illustrating the plunger speed and the compensation flow rate in the embodiment.

FIG. 11 is a graph illustrating the plunger speed and the compensation flow rate in the pump of the embodiment of FIG. 10.

In the parallel pump, pre-compression is performed on both the right subunit 300 and the left subunit 310. Therefore, the compensation flow rate calculation unit 321 calculates the heat generation and cooling of the mobile phase for each of the right subunit 300 and the left subunit 310, obtains the compensation flow rate, and sums the left and right compensation flow rates. As a result, the total compensation flow rate is obtained. The compensation flow rate is given, for example, by increasing the plunger speed for the subunit during the discharge process to increase the discharge rate.

The compensation flow rate calculation unit 321 obtains the mobile phase pressure in the right pump head 301 during the pre-compression process assuming that the mobile phase pressure is proportional to both the speed of the right plunger 302 and the mobile phase pressure in the discharge flow path 317. Likewise, the compensation flow rate calculation unit 321 calculates the mobile phase pressure in the left pump head 311 during the pre-compression process assuming that the mobile phase pressure is proportional to both the speed of the left plunger 312 and the mobile phase pressure in the discharge flow path 317.

Figure 12:
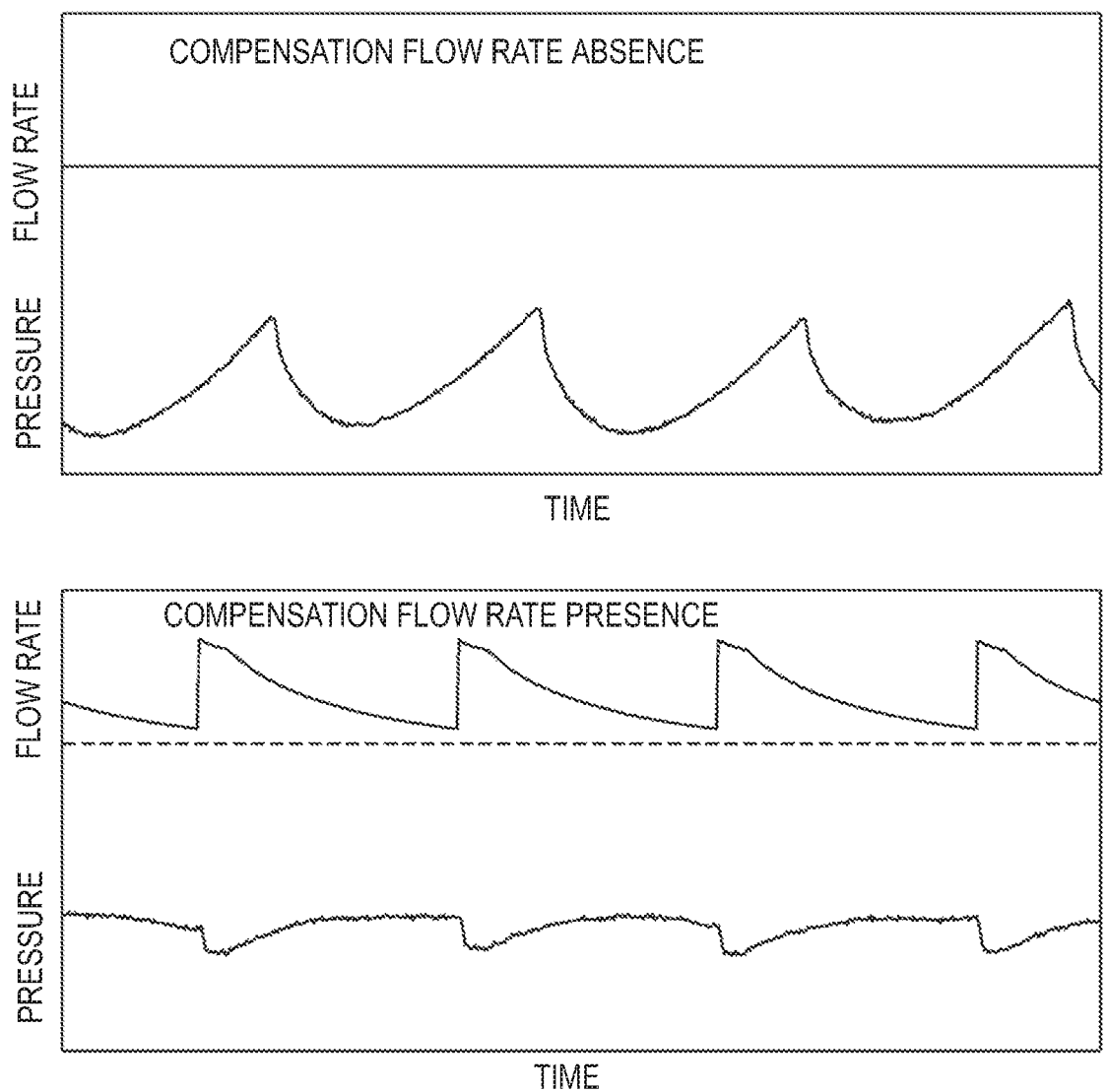
FIG. 12 is data illustrating the effect of the embodiment.

FIG. 12 is a graph illustrating the effect of the embodiment of the liquid feeding apparatus illustrated in FIG. 10. In FIG. 12, a horizontal axis represents the time. A vertical axis represents the pressure and flow rate set value of the mobile phase in the discharge flow path. The upper graph illustrates a pressure waveform in a case where the thermal compensation flow rate is not given. The lower graph is a pressure waveform when a compensation flow rate is given according to another embodiment.

As in the case of a serial pump which is an embodiment of the liquid feeding apparatus in FIG. 9, even in a parallel pump which is another embodiment of the liquid feeding apparatus, the thermal effect pulsation is counteracted and the liquid feeding stability is improved.

In the embodiment of the parallel type pump described with reference to FIG. 10, a right pressure sensor for measuring the fluid pressure in the right pump head 301, and a left pressure sensor for measuring the fluid pressure in the left pump head 311 may be provided. In this case, the compensation flow rate calculation unit 321 can obtain the fluid pressure in the right pump head 301 or the mobile phase pressure in the left pump head 311 during the pre-compression process, on the basis of the output of the right pressure sensor or the output of the left pressure sensor.

Further, although this embodiment is an independent drive type including separate actuators for the right subunit 300 and the left subunit 310, the embodiment of the parallel type pump may be a drive mechanism type in which the speed ratio between the right plunger and the left plunger is fixed (one-motor cam type or one-motor ball screw type etc.).

In this case, in order to obtain the compensation flow rate, the plunger speed of one plunger pump during the discharge process is increased to increase the discharge amount, and at the same time, the plunger speed of the other plunger pump during the suction process is also increased to increase the suction amount. Since these plunger pumps are fluidly connected in parallel between the suction flow path and the discharge flow path, even when the suction amount of the other plunger pump during the suction process increases, there is no influence on the pressure and the flow rate of the mobile phase in the discharge flow path.

Further, when the plunger speed increases during the suction process and the suction amount of the mobile phase increases, the period of the suction process becomes slightly shorter than a case where the plunger speed does not increase. The period of the pre-compression process or the period of the discharge process or both of them are slightly shortened accordingly.

Similarly to the description of the serial double plunger pump, when a hand-over section is provided in the parallel double plunger pump, the timing just after the start of the discharge process of the right subunit 300 overlaps the timing just before the end of the discharge process of the left subunit 310. Also, the timing just before the end of the discharge process of the right subunit 300 overlaps the timing just after the start of the discharge process of the left subunit 310.

In this case, in order to obtain a desired flow compensation amount, it is possible to select one of the following options:

(a) an increase in the plunger speed (discharge amount) of the subunit just after the start of the discharge process, (b) an increase in the plunger speed of the subunit just before the end of the discharge process, and (c) an increase in the plunger speed of the subunit just after the start of the discharge process and an increase in the plunger speed of the subunit just before the end of the discharge process.

The above method (c) can also be applied to a drive mechanism type in which the speed ratio between the right plunger 302 and the left plunger 312 is fixed. However, in this case, the hand-over section becomes shorter than a case where the plunger speed is not corrected.

Further, although the embodiment of the parallel type pump described with reference to FIG. 10 includes the right subunit 300 and the left subunit 310 connected to each other in parallel, in the embodiment of the invention, the number of subunits connected in parallel is not limited to two. In the embodiment of the liquid feeding apparatus of the invention, three or more subunits (plunger pumps) may be connected in parallel.

Next, another embodiment will be described with reference to FIGS. 13 and 14.

Figure 13:
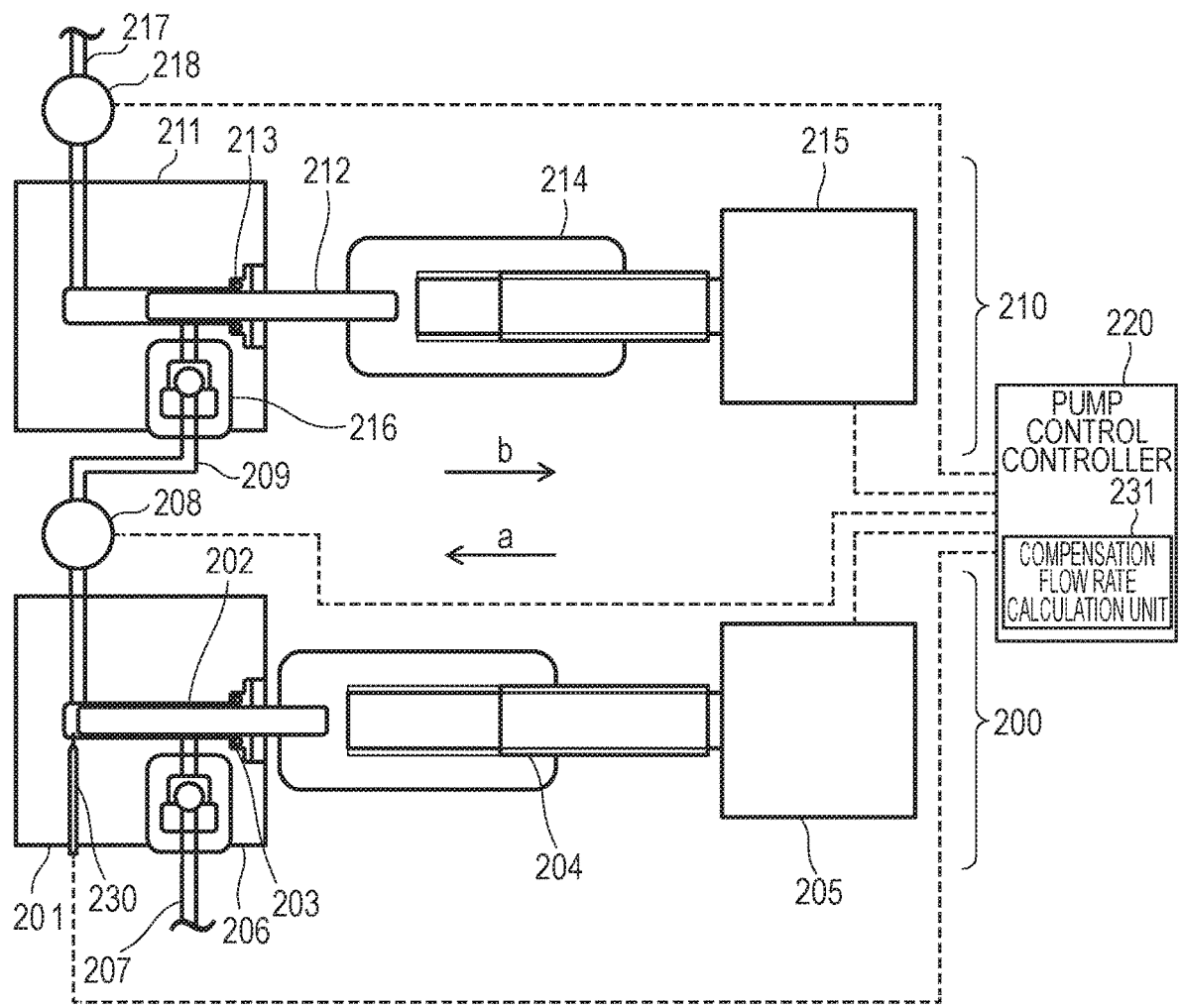
FIG. 13 is a schematic configuration diagram illustrating a configuration of still another embodiment of the liquid feeding apparatus.
Figure 14:
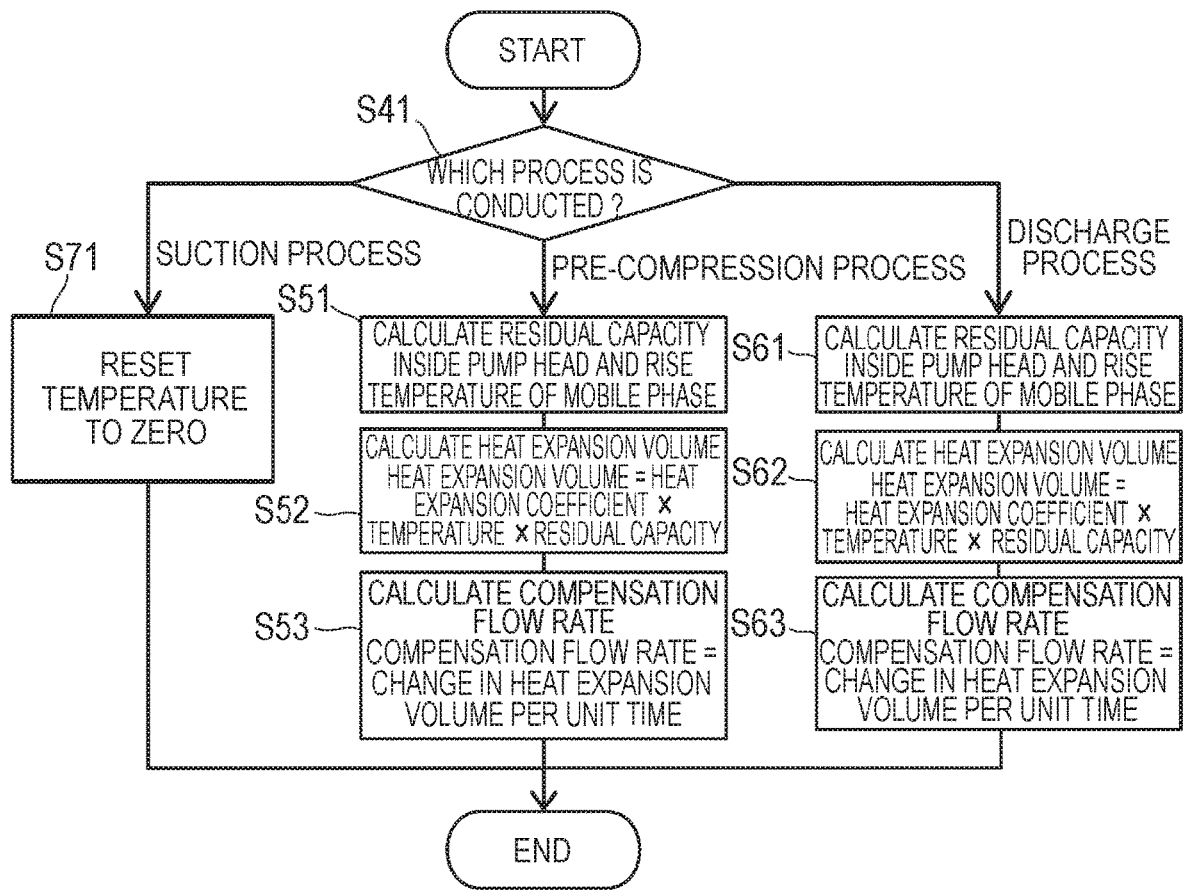
FIG. 14 is a calculation flow chart of a compensation flow rate illustrating another embodiment of the method for controlling liquid feeding of the liquid feeding apparatus.
Figure 15:
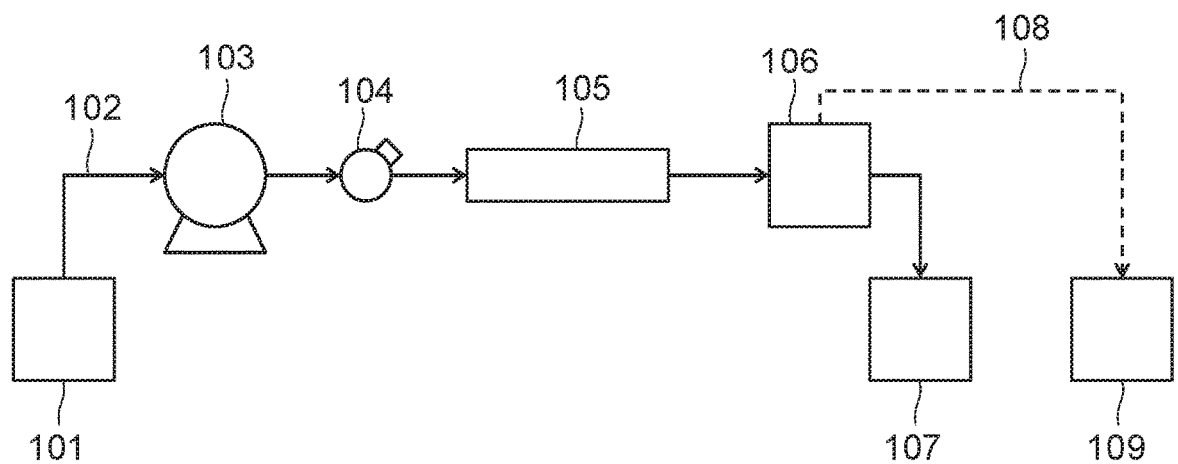
FIG. 15 is a schematic configuration diagram illustrating a liquid chromatograph.

FIG. 13 is a schematic configuration diagram illustrating the configuration of still another embodiment of the liquid feeding apparatus. FIG. 14 is a flowchart for calculating a compensation flow rate illustrating another embodiment of the method for controlling liquid feeding of the liquid feeding apparatus. In FIG. 13, portions that perform the same function as those of FIG. 1 are denoted by the same reference numerals.

As illustrated in FIG. 13, the liquid feeding apparatus of this embodiment further includes a thermometer 230 for measuring the fluid temperature in the primary pump head 201 of the primary subunit 200, in comparison with the liquid feeding apparatus illustrated in FIG. 1. The thermometer 230 includes, for example, a thin thermocouple having good followability to temperature change, as a sensor. Further, the pump control controller 220 includes a compensation flow rate calculation unit 231. Other configurations of the liquid feeding apparatus of this embodiment are the same as those of the liquid feeding apparatus illustrated in FIG. 1.

The compensation flow rate calculation unit 231 calculates the thermal expansion volume of the fluid, from the measured rising temperature of the mobile phase of the primary pump head 201 and the remaining volume capacity of the primary pump head 201 for each calculation cycle, using the output of the thermometer 230, and calculates the compensation flow rate from the change in the thermal expansion volume per unit time.

The calculating procedure of the compensation flow rate will be described with reference to FIGS. 13 and 14.

The compensation flow rate calculation unit 231 determines which process of the pre-compression process, the discharge process, and the suction process, the primary subunit 200 is in (step S41).

When the primary subunit 200 is in the pre-compression process, the compensation flow rate calculation unit 231 calculates the remaining volume capacity in the primary pump head 201 and the rising temperature of the mobile phase in a certain calculation cycle (step S51). The compensation flow rate calculation unit 231 calculates the rising temperature of the mobile phase, using the output of the thermometer 230. The rising temperature of the mobile phase is calculated, for example, on the basis of the temperature of the mobile phase in the primary pump head 201 during the suction process.

The compensation flow rate calculation unit 231 calculates the product of the remaining volume capacity in the primary pump head 201, the rising temperature of the mobile phase, and the thermal expansion coefficient of the mobile phase to obtain the thermal expansion volume of the mobile phase (step S52).

The compensation flow rate calculation unit 231 calculates the compensation flow rate on the basis of the change in the thermal expansion volume per unit time (step S53).

The process returns to step S41. Steps S51 to S53 are repeated, while the primary subunit 200 is in the primary pre-compression process.

When the primary subunit 200 is in the discharge process, the compensation flow rate calculation unit 231 calculates the remaining volume capacity in the primary pump head 201 and the rising temperature of the mobile phase in the same manner as in step S51 (step S61). When the primary subunit 200 enters the discharge process, as described above, the rise of the primary pressure stops, the heat generation of the mobile phase stops and only the cooling occurs, and the thermal expansion amount of the mobile phase in the primary pump head 201 monotonously decreases.

The compensation flow rate calculation unit 231 calculates the thermal expansion volume of the mobile phase in the same manner as in step S52 (step S62).

The compensation flow rate calculation unit 231 calculates the compensation flow rate in the same manner as in step S53 (step S63). The compensation flow rate here is a decrease amount of the thermal expansion volume per unit time of the mobile phase in the primary pump head 201. The compensation flow rate is a positive value.

The pump control controller 220 corrects the speed of the primary plunger 202, the speed of the secondary plunger 212, or both so as to obtain the positive compensation flow rate calculated by the compensation flow rate calculation unit 231 (correcting step). As a result, the thermal effect pulsation is canceled out. This correcting step is performed only during the discharge process.

When the primary subunit 200 is in the suction process, the compensation flow rate calculation unit 231 resets the rising temperature of the mobile phase in the primary pump head 201 to zero on the basis of the output of the thermometer 230 (step S71). The output of the thermometer 230 at this time serves as a reference when calculating the rising temperature of the mobile phase in steps S51 and S61.

Each step of the above-described embodiment can be achieved by preparing a program for processing each step and executing the program using a computer.

As compared to the calculating process described with reference to FIG. 2, in the calculating process of the compensation flow rate described with reference to FIG. 14, the calculating processes (steps S11 to S16, and S21 to S22), such as the calculation processes of the pressure rise of the mobile phase in the primary pump head 201, the amount of heat generation, the rising temperature after cooling, and the current rising temperature are not required. In this way, by directly measuring the temperature of the mobile phase in the primary pump head 201, the calculating process of the compensation flow rate is simplified.

It is needless to say that a configuration, in which a thermometer for measuring the fluid temperature in the plunger pump for performing the pre-compression process is provided and the compensation flow rate calculation unit calculates the compensation flow rate using the output of the thermometer, is applicable to a parallel pump (for example, a parallel double plunger pump illustrated in FIG. 10).

Meanwhile, Patent Literature 2 discloses a liquid feeding apparatus that compensates for thermal effect pulsation. The liquid feeding apparatus is limited to a serial type pump. The liquid feeding apparatus performs the constant pressure feedback at the timing (the filling process from the primary side to the secondary side) at which thermal effect pulsation occurs, after predicting the time evolution of the system pressure. The speed of the secondary side is corrected by the constant pressure feedback, and the system pressure is maintained at the predicted value.

However, in the high-pressure gradient system, it is difficult to discriminate which of the two pumps generate the thermal effect pulsation. When the pulsation of one pump is compensated by the other pump, the system pressure is maintained, but the accuracy of the concentration ratio deteriorates inversely.

Further, Patent Literature 3 describes reduction in the pre-compression amount to prevent the pre-compression from being excessive than the assumption, by adiabatic compression. Further, although the temperature decreases and the flow rate decreases after pre-compression, addition of a positive compensation flow rate is described in order to cancel this.

However, the pre-compression is assumed to be only adiabatic. Since the pre-compression condition is between the adiabatic and the isothermal when the pre-compression time is long, the compensation amount needs to be small. However, Patent Literature 3 does not consider this.

Further, Patent Literature 4 discloses a liquid feeding apparatus in which the liquid feeding apparatus described in Patent Literature 2 is improved. This liquid feeding apparatus is different from the liquid feeding apparatus of Patent Literature 2 in that the pressure is fed back only on the primary side and the secondary side does not change the driving pattern.

However, this liquid feeding apparatus has a problem which occurs in the high-pressure gradient system as described above.

Further, Patent Literatures 5 and 6 disclose a method for measuring the decompression due to cooling by stopping the plunger during pre-compression and calculating the compensation flow rate after pre-compression. Further, as another method, it is disclosed that the plunger position is fed back so that the pressure becomes constant during pre-compression (by canceling decompression due to cooling) and the flow rate is compensated by extrapolating the motion of the plunger after pre-compression.

However, at a high flow rate (several mL/min), the pre-compression time becomes short (about 100 milliseconds), and there is a problem of difficulty in securing the time of the plunger operation for calculating the compensation flow rate.

In the embodiment of the invention, a stable flow rate can be obtained even when the mobile phase generates heat during pre-compression, without causing these problems.

For example, since the embodiment of the invention is not constant pressure feedback, the other pump does not compensate for thermal effect pulsation of one pump in the high-pressure gradient system.

Further, in the embodiment of the invention, the compensation flow rate can be calculated on the basis of the physical property values of the same mobile phase in a case where the pre-compression process is slow and a case where the pre-compression process is fast, and there is no need to individually adjust the compensation flow rate.

Also, the embodiment of the invention does not require special plunger driving for thermal compensation during the pre-compression process.

Further, the embodiment of the invention has versatility, since the heat generation proportion coefficient of the mobile phase can be calculated from generally published physical property values.

Further, in the embodiment of the invention, it is possible to calculate the cooling for each space portion inside the pump head, thereby enabling finer compensation.

Also, the embodiment of the invention may change one plunger speed or change both plunger speeds when changing the plunger speed to provide the compensation flow rate. In particular, the latter illustrates that the embodiment of the invention can also be used in a pump of a type in which a plurality of plungers is driven by a single motor.

Although the embodiments of the invention have been described above, the configurations, arrangements, numerical values, and the like in the above-described embodiments are merely examples, the invention is not limited thereto, and various modifications can be made within the scope of the invention described in the claims.

The liquid feeding apparatus of the embodiment of the invention can be applied to, for example, a liquid feeding pump for ultrahigh pressure LC (UHPLC), a plunger pump for liquid delivery such as a chemical plant, and the like.

The invention claimed is:

1. A liquid feeding apparatus comprising:
a plurality of plunger pumps fluidly connected in series or in parallel between a suction flow path and a discharge flow path; and
a control unit configured to control an operation of the plunger pumps,
wherein the control unit periodically operates the plunger pumps,
the period includes
a suction process for sucking fluid to the plunger pumps,
a pre-compression process for compressing a fluid pressure in the plunger pump to a fluid pressure in the discharge flow path for at least one of the plunger pumps, and
a discharge process for discharging the fluid in the plunger pumps to the discharge flow path,
wherein the control unit is configured to perform the substantially continuous fluid discharge by at least one other plunger pump being in the discharge process when one of the plunger pumps is in the suction process,
the control unit further includes a compensation flow rate calculation unit configured to calculate a compensation flow rate, that is positive, which changes with time in synchronization with the period with respect to a set flow rate,
the compensation flow rate is a flow rate which compensates for a loss of the flow rate caused by cooling and contraction in the discharge process after the fluid in the plunger pump is compressed and heated in the pre-compression process,
the compensation flow rate calculation unit is configured to calculate the compensation flow rate for the discharge process during the pre-compression process which is performed immediately before the discharge process, on the basis of a rising temperature during the pre-compression process of the fluid in the plunger pump calculated using a pressure of the fluid measured during the pre-compression process, or on the basis of a rising temperature during the pre-compression process of the fluid in the plunger pump measured during the pre-compression process, the control unit is configured to correct the plunger speed of the at least one plunger pump during the discharge process to obtain the compensation flow rate, and wherein the compensation flow rate calculation unit is configured to calculate the compensation flow rate on the basis of the correlation, for each calculation cycle, the compensation flow rate calculation unit is configured to calculate a pressure rise per unit time of the fluid in the plunger pump during the pre-compression process, calculate a heat generation amount per unit time proportional to the pressure rise, calculate the rising temperature after cooling over time from the rising temperature calculated in the previous calculation cycle, calculate a current rising temperature from the rising temperature after the cooling and the heat generation amount, calculate a thermal expansion volume of the fluid from the current rising temperature and a remaining volume capacity in the plunger pump, and calculate the compensation flow rate from a change in the thermal expansion volume per unit time.

2. The liquid feeding apparatus according to claim 1, wherein, the compensation flow rate calculation unit is configured to calculate the heat generation amount assuming that the proportional coefficient between the pressure rise per unit time and the heat generation amount is $\beta T/C_p \rho$ when a thermal expansion coefficient of the fluid is set as $\beta$, a temperature is set as T, a constant pressure specific heat is set as $C_p$, and a density is set as $\rho$.

3. The liquid feeding apparatus according to claim 1, wherein the compensation flow rate calculation unit is configured to set the rising temperature after cooling to the current rising temperature for the fluid in the plunger pump during the discharge process.

4. The liquid feeding apparatus according to claim 1, wherein the compensation flow rate calculation unit is configured to calculate the current rising temperature on the assumption that there is no heat generation of the fluid in the plunger pump during the suction process.

5. The liquid feeding apparatus according to claim 1, wherein the compensation flow rate calculation unit is configured to calculate the pressure rise from an output of a pressure sensor which measures the pressure of the fluid in the plunger pump during the pre-compression process.

6. The liquid feeding apparatus according to claim 1, wherein the compensation flow rate calculation unit is configured to obtain the pressure rise from the calculation on the assumption that the pressure rise is proportional to both the plunger speed of the plunger pump and the fluid pressure in the discharge flow path during the pre-compression process.

7. The liquid feeding apparatus according to claim 1, further comprising:

a thermometer which measures the fluid temperature in the plunger pump which performs the pre-compression process, wherein the compensation flow rate calculation unit is configured to calculate the compensation flow rate on the basis of the measured rising temperature, using the output of the thermometer, and for each calculation cycle, the compensation flow rate calculation unit is configured to calculate the thermal expansion volume of the fluid from the rising temperature of the fluid and the remaining volume capacity, and calculate the compensation flow rate from a change in the thermal expansion volume per unit time.

8. The liquid feeding apparatus according to claim 1, wherein the compensation flow rate calculation unit is configured to set an amount of decrease in the thermal expansion volume per unit time of the fluid in the plunger pump during the discharge process as the compensation flow rate.

9. The liquid feeding apparatus according to claim 1, further comprising:

a primary plunger pump and a secondary plunger pump as the plunger pump, wherein, between the suction flow path and the discharge flow path, a primary check valve, the primary plunger pump, a secondary check valve, and the secondary plunger pump are fluidly connected in series in that order from the suction flow path, the primary plunger pump includes a primary pump head, a primary plunger which reciprocates inside the primary pump head in an axial direction, a primary sealing member which seals a space between the primary pump head and the primary plunger, a primary inlet flow path and a primary outlet flow path provided in the primary pump head, and a primary drive mechanism which causes the primary plunger to reciprocate, the secondary plunger pump includes a secondary pump head, a secondary plunger which reciprocates inside the secondary pump head in the axial direction, a secondary sealing member which seals a space between the secondary pump head and the secondary plunger, a secondary inlet flow path and a secondary outlet flow path provided in the secondary pump head, and a secondary drive mechanism which causes the secondary plunger to reciprocate, in the period, the suction process includes a primary suction process for moving the primary plunger in a direction away from the primary pump head to suck the fluid into the primary plunger pump, and a secondary suction process for moving the secondary plunger in a direction away from the secondary pump head to suck the fluid from the primary pump head to the secondary pump head, the pre-compression process includes a primary pre-compression process for moving the primary plunger in a direction approaching the primary pump head to compress the fluid pressure in the primary pump head up to the fluid pressure of the discharge flow path, the discharge process includes a primary discharge process for moving the primary plunger in a direction approaching the primary pump head after the primary pre-compression process to discharge the fluid in the primary pump head to the discharge flow path, while passing through the secondary pump head, and a secondary discharge process for moving the secondary plunger in a direction approaching the secondary pump head to discharge the fluid in the secondary pump head to the discharge flow path, the primary discharge process is performed almost during the secondary suction process, the secondary discharge process is performed almost during the primary suction process and during the primary pre-compression process, and the control unit is configured to correct at least one of the speed of the primary plunger during the primary discharge process and the speed of the secondary plunger during the secondary suction process to obtain the compensation flow rate.

10. The liquid feeding apparatus according to claim 9, wherein the control unit is configured to give the compensation flow rate by increasing the speed of the primary plunger during the primary discharge process.

11. The liquid feeding apparatus according to claim 9, wherein the control unit is configured to give the compensation flow rate by reducing the speed of the secondary plunger during the secondary suction process.

12. The liquid feeding apparatus according to claim 9, wherein the control unit is configured to give the compensation flow rate, by increasing the speed of the primary plunger during the primary discharge process and simultaneously increasing the speed of the secondary plunger during the secondary suction process, and by setting an increase amount of the speed of the primary plunger to be larger than an increase amount of the speed of the secondary plunger.

13. The liquid feeding apparatus according to claim 1, wherein, between the suction flow path and the discharge flow path, the plurality of plunger pumps is fluidly connected to the suction flow path in parallel via an inlet check valve, and fluidly connected to the discharge flow path in parallel via an output check valve,
the plunger pump includes a pump head, a plunger reciprocating in the pump head in the axial direction, a sealing member which seals a space between the pump head and the plunger, an inlet flow path and an outlet flow path provided in the pump head, and a drive mechanism which causes the plunger to reciprocate,
the period includes
the suction process for moving the plunger in a direction away from the pump head to suck the fluid from the inlet flow path to the pump head,
the pre-compression process for moving the plunger in the direction approaching the pump head to compress the fluid pressure in the pump head up to the fluid pressure of the outlet flow path, and
the discharge process for further moving the plunger in the direction approaching the pump head after the pre-compression process to discharge the fluid in the pump head to the outlet flow path, and
the control unit is configured to correct the plunger speed of at least one plunger pump to obtain the compensation flow rate.

14. The liquid feeding apparatus according to claim 13, wherein the control unit is configured to give the compensation flow rate by increasing the plunger speed of the plunger pump during the discharge process.

15. A method for controlling liquid feeding of a liquid feeding apparatus in which a plurality of plunger pumps fluidly connected in series or in parallel between a suction flow path and a discharge flow path is periodically operated,
wherein the period includes
a suction process for sucking fluid to the plunger pumps,
a pre-compression process for compressing a fluid pressure in the plunger pump up to a fluid pressure in the discharge flow path for at least one of the plunger pumps, and
a discharge process for discharging the fluid in the plunger pumps to the discharge flow path,
the substantially continuous fluid discharge is performed by at least one other plunger pump being in the discharge process when one of the plunger pumps is in the suction process,
the method comprising:
a compensation flow rate calculating step of calculating a compensation flow rate, that is positive, which changes with time in synchronization with the period with respect to a set flow rate; and
a correction step of correcting the plunger speed of the at least one plunger pump to obtain the compensation flow rate,
wherein the compensation flow rate is a flow rate which compensates for a loss of the flow rate caused by cooling and contraction in the discharge process after the fluid in the plunger pump is compressed and heated in the pre-compression process, and
the compensation flow rate calculating step calculates the compensation flow rate for the discharge process during the pre-compression process which is performed immediately before the discharge process, on the basis of a rising temperature during the pre-compression process of the fluid in the plunger pump calculated using a pressure of the fluid measured during the pre-compression process, or on the basis of a rising temperature during the pre-compression process of the fluid in the plunger pump measured during the pre-compression process,
wherein the compensation flow rate calculating step is a step of calculating the compensation flow rate on the basis of the correlation, and wherein:
for each calculation cycle,
a pressure rise calculating step of calculating a pressure rise per unit time of the fluid in the plunger pump during the pre-compression process;
a heat generation amount calculating step of calculating a heat generation amount per unit time, proportional to the pressure rise;
an after-cooling temperature calculating step of calculating the rising temperature after cooling over time from the rising temperature calculated in the previous calculation cycle;
a current temperature calculating step for calculating a current rising temperature from the rising temperature after the cooling and the heat generation amount;
a thermal expansion volume calculating step of calculating a thermal expansion volume of the fluid from the current rising temperature and a remaining volume capacity in the plunger pump; and
a compensation flow rate calculating step of calculating the compensation flow rate from a change in the thermal expansion volume per unit time.

16. The method for controlling liquid feeding of the liquid feeding apparatus according to claim 15, wherein in the heat generation amount calculating step, the heat generation amount is calculated assuming that a proportional coefficient between the pressure rise per unit time and the heat generation amount is $\beta T/C_p \rho$ when a thermal expansion coefficient of the fluid is set as $\beta$, a temperature is set as T, a constant pressure specific heat is set as $C_p$, and a density is set as $\rho$.

17. The method for controlling liquid feeding of the liquid feeding apparatus according to claim 15, wherein in the current temperature calculating step, for the fluid in the plunger pump during the discharge process, the rising temperature after cooling is set as the current rising temperature.

18. The method for controlling liquid feeding of the liquid feeding apparatus according to claim 15, wherein, in the current temperature calculating step, during the suction process, the current rising temperature is calculated on the assumption that there is no heat generation of the fluid in the plunger pump.

19. The method for controlling liquid feeding of the liquid feeding apparatus according to claim 15, wherein, in the pressure rise calculating step, the pressure rise is calculated from an output of a pressure sensor which measures the pressure of the fluid in the plunger pump during the pre-compression process.

20. The method for controlling liquid feeding of the liquid feeding apparatus according to claim 15, wherein, in the pressure rise calculating step, the pressure rise is obtained from the calculation on the assumption that the pressure rise is proportional to both the plunger speed of the plunger pump and the fluid pressure in the discharge flow path during the pre-compression process.

21. The method for controlling liquid feeding of the liquid feeding apparatus according to claim 15, wherein the pressure rise calculating step is a step of calculating the compensation flow rate on the basis of the measured rising temperature, using the output of a thermometer configured to measure the fluid temperature in the plunger pump for performing the pre-compression process, and for each calculation cycle,
the pressure rise calculating step includes a thermal expansion volume calculating step of calculating a thermal expansion volume of the fluid from a rising temperature and a remaining volume capacity of the fluid in the plunger pump in the plunger pump, and
a compensation flow rate calculating step of calculating the compensation flow rate from a change in the thermal expansion volume per unit time.

22. The method for controlling liquid feeding of the liquid feeding apparatus according to claim 15, wherein, in the compensation flow rate calculating step, an amount of decrease in the thermal expansion volume per unit time of the fluid in the plunger pump during the discharge process is set as a compensation flow rate.

23. The method for controlling liquid feeding of the liquid feeding apparatus according to claim 15, wherein the correcting step gives the compensation flow rate by increasing the plunger speed of the plunger pump during the discharge process.

24. The method for controlling liquid feeding of the liquid feeding apparatus according to claim 15, wherein the correcting step gives the compensation flow rate, by decreasing the plunger speed of the plunger pump during the suction process.

25. The method for controlling liquid feeding of the liquid feeding apparatus according to claim 15, wherein the correcting step gives the compensation flow rate, by increasing the plunger speed of the plunger pump during the discharge process and at the same time increasing the plunger speed of the plunger pump during the suction process, and by setting an increase amount of the plunger speed of the plunger pump during the discharge process to be larger than an increase amount of the plunger speed of the plunger pump during the suction process.

26. A liquid feeding control program for causing a computer to execute each step of the method for controlling liquid feeding of the liquid feeding apparatus according to claim 15.

* * * * *